(12) United States Patent
Muraoka et al.

(10) Patent No.: US 9,386,537 B2
(45) Date of Patent: Jul. 5, 2016

(54) RECEIVED POWER ESTIMATION DEVICE, RECEIVED POWER ESTIMATE METHOD, PROGRAM, SENSOR STATION, AND RADIO SYSTEM

(71) Applicant: NEC Corporation, Tokyo (JP)

(72) Inventors: Kazushi Muraoka, Tokyo (JP); Kojiro Hamabe, Tokyo (JP); Hiroto Sugahara, Tokyo (JP); Toshifumi Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 14/368,454

(22) PCT Filed: Dec. 13, 2012

(86) PCT No.: PCT/JP2012/082416
§ 371 (c)(1),
(2) Date: Jun. 24, 2014

(87) PCT Pub. No.: WO2013/099643
PCT Pub. Date: Jul. 4, 2013

(65) Prior Publication Data
US 2014/0378177 A1 Dec. 25, 2014

(30) Foreign Application Priority Data
Dec. 27, 2011 (JP) .................................. 2011-285233

(51) Int. Cl.
*H04B 1/00* (2006.01)
*H04W 52/24* (2009.01)
(Continued)

(52) U.S. Cl.
CPC ............. *H04W 52/242* (2013.01); *H04B 17/21* (2015.01); *H04B 17/318* (2015.01); *H04W 16/14* (2013.01); *H04W 72/0453* (2013.01); *H04W 52/20* (2013.01); *H04W 52/241* (2013.01); *H04W 52/243* (2013.01); *H04W 52/245* (2013.01)

(58) Field of Classification Search
CPC ... H04W 52/242; H04W 16/14; H04W 24/08; H04W 52/143; H04W 52/146; H04W 52/20; H04W 52/243; H04W 52/245; H04W 52/325; H04W 72/0453; G01S 5/0242; G01S 5/0252
USPC ........ 455/63.1, 63.3, 67.11, 67.13, 67.14, 68, 455/69, 418, 501, 522; 370/328, 329, 330, 370/335; 375/148, E1.031, E1.032
See application file for complete search history.

(56) References Cited

U.S. PATENT DOCUMENTS

| 2012/0004006 A1* | 1/2012 | Lu ........................ H04L 5/0007 455/522 |
| 2012/0329403 A1* | 12/2012 | Muraoka ............... H04W 16/14 455/67.13 |
| 2014/0112179 A1* | 4/2014 | Muraoka ............... H04W 24/02 370/252 |

FOREIGN PATENT DOCUMENTS

| JP | 2009-100452 | 5/2009 |
| WO | WO 2011/108376 | 9/2011 |

OTHER PUBLICATIONS

International Search Report, PCT/JP2012/082416, Feb. 19, 2013.
(Continued)

*Primary Examiner* — Shaima Q Aminzay
(74) *Attorney, Agent, or Firm* — Young & Thompson

(57) ABSTRACT

The present invention is a device which, when a second wireless system shares the use of a frequency which is allocated to a first wireless system, estimates receiving power when a second wireless signal which is transmitted from a transmission station of the second wireless system is received at a receiving station of the first wireless system. The receiving power estimation device comprises a correction means for correcting a receiving power estimate value of the second wireless signal at the first wireless system receiving station which is computed using an estimate value of path loss from the second wireless system transmission station to the first wireless system receiving station, said correction using a receiving power measurement value of the second wireless signal which is measured in a transmission station periphery sensor station which is a sensor station which is located in the periphery of the second wireless system transmission station.

19 Claims, 11 Drawing Sheets

(51) Int. Cl.
*H04W 16/14* (2009.01)
*H04W 72/04* (2009.01)
*H04B 17/21* (2015.01)
*H04B 17/318* (2015.01)
*H04W 52/20* (2009.01)

(56) References Cited

OTHER PUBLICATIONS

Journal of Electronic Communications Committee (ECC) within the European Conference of Postal and Telecommunications Administrations (CEPT), "Technical and Opertaional Requirements for the Possible Operation of Cognitive Radio Systems in the White Spaces of teh Frequence Band 470-790MHz", ECC Report 159, pp. 23-35, Jan. 2011.

Counterpart Extended European Search Report dated Jul. 8, 2015 in corresponding European Application 12863552.1.

Kazushi Muraoka et al.: "Monitoring-based Spectrum Management for Expanding Opportunities of White Space Utilization", IEEE International Symposium on New Frontiers in Dynamic Spectrum Access Networks: 2011.05.03-06 DYSPAN: pp. 277-284.

* cited by examiner

RECEIVED POWER ESTIMATION DEVICE, RECEIVED POWER ESTIMATE METHOD, PROGRAM, SENSOR STATION, AND RADIO SYSTEM

TECHNICAL FIELD

The present invention relates to a device for estimating received power at a radio station, a method, a program, a sensor station, and a radio system.

BACKGROUND ART

A cognitive radio which recognizes an ambient radio environment to optimize a communication parameter according to the ambient radio environment has been known. In an exemplary cognitive radio, there is such a case that a secondary system (interfering system) shares a frequency band allocated to a primary system (interfered system).

While the secondary system shares the frequency band with the primary system, it is required to prevent the secondary system from exerting an adverse effect on an existing service provided by the primary system. Therefore, in a transmitter of the secondary system (hereinafter referred to as "secondary transmitter"), communication is made at a transmission power (hereinafter referred to as "actual transmission power") adjusted to a value equal to or less than the maximum value of transmission power (hereinafter referred to as "allowed transmission power"), the maximum value of transmission power being capable of keeping a predetermined reception quality in a receiver of the primary system (hereinafter referred to as "primary receiver"). Here, for example, a criterion for keeping the predetermined reception quality is to keep a CIR (Carrier to Interference Ratio) and a CINR (Carrier to Interference plus Noise Ratio) of the primary receiver at a value equal to or more than a predetermined value or to control an interfered amount of the primary receiver to a value equal to or less than a predetermined value.

Non-patent Literature 1 discloses allowed transmission power that controls the CIR at a receiver of a TV (Television) broadcasting system as the primary system to a value equal to or more than the predetermined value. In Non-patent Literature 1, a path loss (propagation loss) at a time when the signal transmitted from the secondary transmitter (secondary signal) arrives at the primary receiver is estimated, and an interfered amount of the primary receiver generated by the secondary signal is further estimated. As a result, allowed transmission power thereof is determined. However, the path loss generated under the actual environment is affected by a planimetric feature around the secondary transmitter, topography between the secondary transmitter and the primary receiver, and shadowing due to the planimetric feature around the primary receiver. This generates an error with respect to a propagation model (path loss estimation of, for example, Okumura-Hata model), resulting in generation of an estimation error of the CIR. Therefore, in Non-patent Literature 1, the allowed transmission power is set by adding a margin corresponding to a degree of the error of the CIR. This ensures constraint of the allowed transmission power corresponding to the degree of the estimation error of the CIR and keeping of the CIR at a prescribed probability. However, if a large margin is required to be set to the allowed transmission power, the allowed transmission power results in decrease.

Further, Patent Literature 1 discloses that a base station device in a radio communication system shares a common and/or neighboring frequency band with another radio communication system, a spaced frequency width between a frequency band to be used of its own and the frequency band to be used by another radio communication system is calculated, an offset distance between an own base station device and a receiving device of another radio communication system is calculated, and, based on the spaced frequency band and the offset distance, the maximum transmission power that would not degrade communication quality of another radio communication system as a priority system is determined Patent Literature 1 further discloses use of the free space propagation loss equation in calculation of the offset distance and the estimated propagation loss amount. Also, in Patent Literature 1, similar to Non-patent Literature 1, presence of the error due to a difference from the actual environment results in generation of an estimation error in the CIR.

Meanwhile, in Non-patent Literature 2, a sensor station located around the primary receiver (disclosed as "receiver of a secondary system (secondary receiver)" in the Literature) measures reception levels of a secondary signal and a signal (primary signal) transmitted from a transmitter of a primary system (primary transmitter) to show an interference monitoring to be used in estimation of the CIR at the primary receiver. In this method, by using the reception levels of the secondary signal and the primary signal that are measured by the sensor station, an estimate value of the path loss used in Non-patent Literature 1 is actually measured and compensated. The actual measurement of the secondary signal ensures estimation of adverse effects of the planimetric feature around the secondary transmitter, topography between the secondary transmitter and the primary receiver, and shadowing due to a planimetric feature around the primary receiver, the adverse effects being causes of the path loss estimation error. Taking the above into consideration, it is possible to compensate the path loss estimate. Similarly, the actual measurement of the primary signal achieves decrease of the estimation error of the path loss between the primary transmitter and the sensor station. This results in decrease of the estimation error of the CIR. Therefore, it is possible to minimize a margin necessary for suppression of the allowed transmission power. This contributes to increase of the allowed transmission power.

CITATION LIST

Patent Literature

[Patent Literature 1]
Japanese Unexamined Patent Application, Primary Publication No. 2009-100452

Non-Patent Literature

[Non Patent Literature 1]
Journal of Electronic Communications Committee (ECC) within the European Conference of Postal and Telecommunications Administrations (CEPT), "TECHNICAL AND OPERATIONAL REQUIREMENTS FOR THE POSSIBLE OPERATION OF COGNITIVE RADIO SYSTEMS IN THE WHITE SPACES OF THE FREQUENCY BAND 470-790 MHz", ECC Report 159, pp 23-35, January, 2011
[Non Patent Literature 2]
Journal of B-17-2 A Cognitive Radio Mobile Network Utilizing White Space Spectrum (3): Interference Monitoring for Advanced Spectrum Management by Kazushi Muraoka, Hiroto Sugahara, Masayuki Ariyoshi (B-17. Software-defined Radio, General Session)

SUMMARY OF INVENTION

Technical Problem

However, in a technique disclosed in Non-patent Literature 2, there may be a case where a measurement error raises a problem during measurement of a reception level of the secondary signal by the sensor station. The problem occurs because the allowed transmission power is set and transmitted such that the reception level of the secondary signal at the sensor station located around the primary receiver becomes relatively lower than a reception level of the primary signal transmitted at the same frequency band (such that the predetermined CIR is secured). In this case, it is necessary to measure the reception level of the secondary signal in the frequency band where the primary signal at a high reception level is present. This makes it difficult to accurately measure the reception level because the secondary signal is affected by the primary signal. In a case where there is a serious measurement error in the measured reception level, it is not possible to decrease the estimation error of the CIR even if the path loss is compensated using the measurement result. Therefore, it might have been impossible to decrease the margin necessary for suppression of the allowed transmission power.

The present invention is made to solve the above described problem. Thus, the purpose of the present invention is to provide a received power estimation device capable of accurately estimating received power of a secondary signal at a primary receiver, a received power estimate method, a received power estimation program, a sensor station, and a radio system.

Solution to Problem

The present invention is directed to a received power estimation device for estimating received power at a time when a secondary radio signal transmitted from a transmitter of a secondary radio system is received at a receiver of a primary radio system while a frequency allocated to the primary radio system is shared with the secondary radio system, wherein the received power estimation device includes compensation means compensating a received power estimate of the secondary radio signal at the receiver of the primary radio system, the received power estimate of the secondary radio signal being calculated using a path loss estimate from the transmitter of the secondary radio system to the receiver of the primary radio system, using the measured received power of the secondary radio signal measured at a near-transmitter sensor station that is located around the transmitter of the secondary radio system.

The present invention is directed to a received power estimate method for estimating received power at a time when a secondary radio signal transmitted from a transmitter of a secondary radio system is received at a receiver of a primary radio system while a frequency allocated to the primary radio system is shared with the secondary radio system, wherein the received power estimate method includes compensating the received power estimate of the secondary radio signal at the receiver of the primary radio system, the received power estimate of the secondary radio signal being calculated using a path loss estimate from the transmitter of the secondary radio system to the receiver of the primary radio system, using a measured received power of the secondary radio signal measured in a near-transmitter sensor station that is located around the transmitter of the secondary radio system.

The present invention is directed to a program for estimating received power at a time when a secondary radio signal transmitted from a transmitter of a secondary radio system is received at a receiver of a primary radio system while a frequency allocated to the primary radio system is shared with the secondary radio system, wherein the program causes a computer to execute compensation of the received power estimate of the secondary radio signal at the receiver of the primary radio system using a measured received power of the secondary radio signal measured in a near-transmitter sensor station that is located around the transmitter of the secondary radio system, the received power estimate of the secondary radio signal being calculated using a path loss estimate from the transmitter of the secondary radio system to the receiver of the primary radio system.

The present invention is directed to a sensor station to be used together with a received power estimation device that estimates received power at a time when a secondary radio signal transmitted from a transmitter of a secondary radio system is received at a receiver of a primary radio system while a frequency allocated to the primary radio system is shared with the secondary radio system, wherein the sensor station includes means measuring the received power of the secondary radio signal based on an instruction of the received power estimation device and notification means notifying the measured received power to the received power estimation device.

The present invention is directed to a radio system including a sensor station and a received power estimation device that estimates received power at a time when a secondary radio signal transmitted from a transmitter of a secondary radio system is received at a receiver of a primary radio system while a frequency allocated to the primary radio system is shared with the secondary radio system, wherein the sensor station includes means measuring the secondary radio signal based on an instruction of the received power estimation device to notify the measured received power to the received power estimation device, and wherein the received power estimation device includes means specifying a sensor station located around the transmitter of the secondary radio system to provide an instruction to measure the received power of the secondary radio signal, acquiring the measured received power of the secondary radio signal from the sensor station, calculating the received power estimate of the secondary radio signal at the receiver using a path loss estimate from the transmitter of the secondary radio system to the receiver of the primary radio system, and compensating the received power estimate using the measured received power.

Advantageous Effect of Invention

According to the present invention, since the received power of the secondary signal is measured at the sensor station located around the secondary transmitter, it is possible to measure the received power of the secondary signal in an environment where the received power of the secondary signal is higher than the received power of the primary signal. This achieves decrease of a measurement error. Compensation of the received power estimate in the primary receiver using the received power of the secondary signal measured by the sensor station ensures minimization of the measurement error as well as decrease of a path loss error due to the influence of planimetric feature around the secondary transmitter. As a result, it is possible to minimize a margin necessary for suppression of allowed transmission power at the secondary transmitter. This ensures setting of a larger allowed transmission power.

DESCRIPTION OF EMBODIMENTS

Embodiments of the present invention will be described below referring to the accompanying drawings.

First Embodiment

Figure 1:
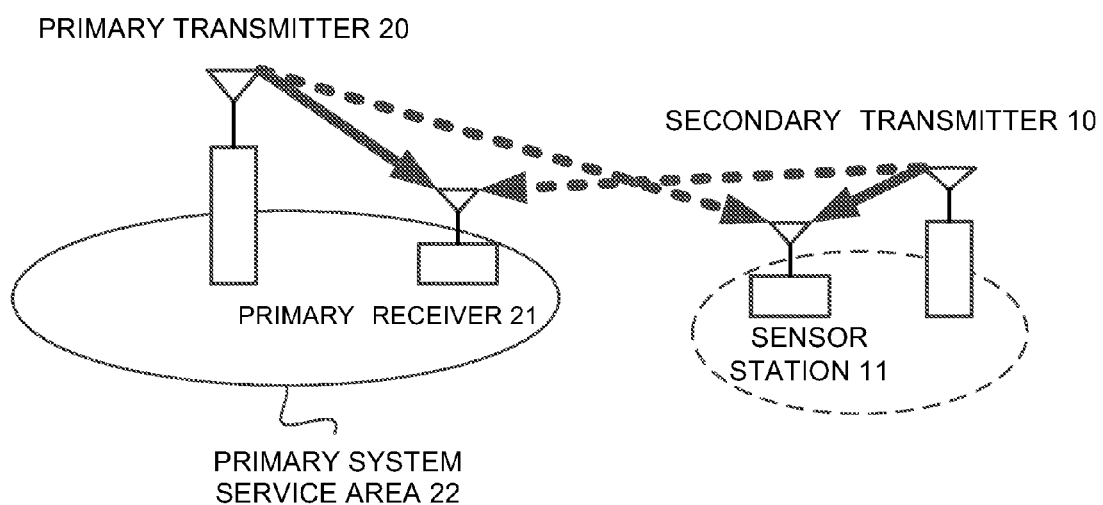
FIG. 1 illustrates a positional relationship between a primary system, a secondary system, and a sensor station according to a first embodiment of the present invention.

FIG. 1 illustrates a positional relationship between a primary system, a secondary system, and a sensor station according to a first embodiment of the present invention. FIG. 1 illustrates a primary transmitter 20, a primary receiver 21, a primary system service area 22, a secondary transmitter 10, and a sensor station 11.

Hereinafter, it is assumed that, for example, the primary system is a TV broadcasting system, and the secondary system is a cellular system. Of course, this is a mere exemplary configuration, and a combination of the primary system and the secondary system is not limited to this. The combination of the primary system and the secondary system may be substituted by, for example, a combination of a TV system and a WRAN (Wireless Regional Access Network) system or a combination of the TV system and a local area radio network or a disaster prevention radio network of, for example, the autonomous community. In another example, the primary system may be a wireless microphone or a specific radio network (e.g., a radio network for a collective housing, a private radio network for company, and a radio network for firming), and the secondary system may be a radio LAN (Local Area Network). The configuration of the first embodiment of the present invention is not necessarily limited to the combination of radio systems having different priorities in using a frequency such as the combination of the primary system and the secondary system. The configuration may be the one assuming that the radio systems having equivalent priorities share a frequency.

In FIG. 1, the secondary transmitter 10 shares a frequency to be used for communication between the primary transmitter 20 and the primary receiver 21 to thereby make communication with a secondary receiver (not shown). Meanwhile, the primary system includes the primary transmitter 20 and the primary receiver 21. FIG. 1 shows only the single primary receiver 21. However, the primary receiver 21 may be plural.

The sensor station 11 measures received power of a secondary signal in order to use it when estimating a received power of the secondary signal at the primary receiver 21 (i.e., an interference power of the secondary signal with respect to the primary receiver 21). The sensor station 11 may be a radio station belonging to the secondary system, or may be a radio station belonging to a system other than the secondary system (e.g., radio system that performs radio wave monitoring for the purpose of grasp of an interference state). Further, FIG. 1 illustrates only the single sensor station 11. However, it is assumed that a plurality of sensor stations is developed in plane at some intervals. Which sensor station in the plurality of sensor stations is actually used will be described later.

Further, FIG. 1 shows propagation of the primary signal and the secondary signal. The primary signal is received at great power by the primary receiver 21 within a primary system service area 22. Meanwhile, the secondary signal is transmitted from the secondary transmitter 10 located away enough from the primary system service area 22 in order to suppress interference with the primary receiver. Therefore, the secondary signal at the primary receiver 21 is suppressed to small power.

Figure 2:
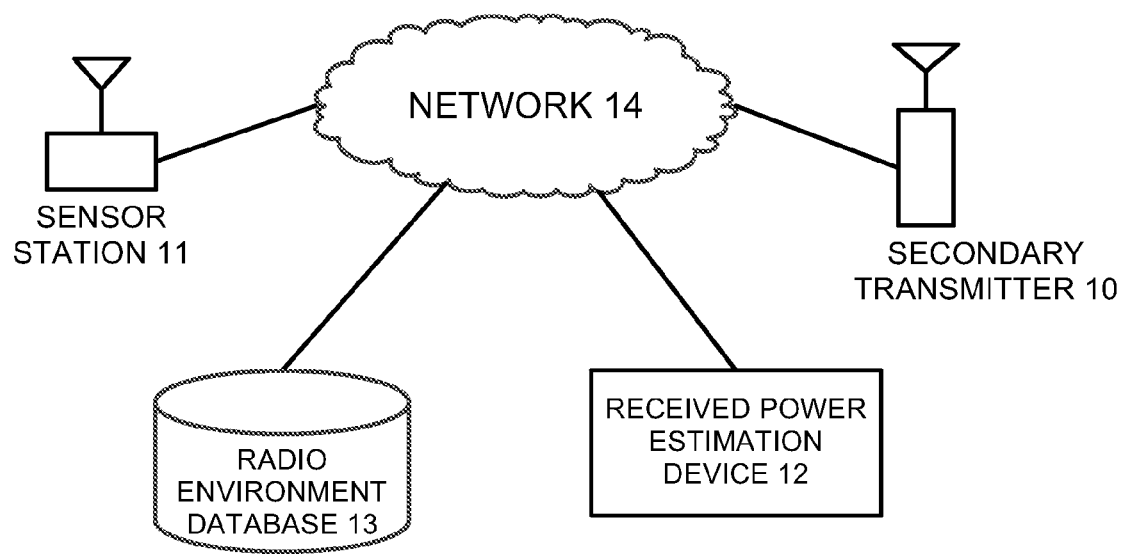
FIG. 2 is a system configuration diagram illustrating an exemplary configuration of an entire system including the secondary system according to the first embodiment of the present invention.

FIG. 2 illustrates an exemplary configuration of an entire system for sharing a frequency. The system includes the secondary transmitter 10, the sensor station 11, a received power estimation device 12, a radio environment database 13, and a network 14.

The secondary system may include, in some cases, configurations other than the above (e.g., a receiver of the secondary system as a communication partner of the secondary transmitter 10). However, the configurations have no direct relation with the embodiment of the present invention and thus are not shown in FIG. 2 for a simple description.

The secondary transmitter 10 shares, as described above, the frequency band of the primary system for communication. At the time, the secondary transmitter 10 makes a request for secondary use (it is possible to designate time or a frequency for secondary use) to the received power estimation device 12 via the network 14. As a response thereto, an allowed transmission power is designated from the received power estimation device 12. The allowed transmission power is the maximum transmission power determined such that the interference power to the primary receiver 21 is suppressed to a value equal to or less than a predetermined value in order to allow the primary receiver 21 to receive the primary signal transmitted from the primary transmitter 20 at merchantable quality. The secondary transmitter 10 makes a transmission at transmission power equal to or less than the allowed transmission power. This limits an interfering amount in order to allow the primary receiver 21 to keep predetermined reception quality even when a frequency is shared between the secondary system and the primary system. The secondary transmitter 10 notifies, if possible, the actual transmission power and the frequency in use to the received power estimation device 12 after determining the transmission power and the frequency. However, in cases where the secondary transmitter 10 frequently updates actual transmission power to be used under the transmission power control and where the secondary transmitter 10 frequently changes the frequency to be used, it is also assumed that the secondary transmitter 10 may not notify the actual transmission power and the frequency to the received power estimation device 12. This will be described later.

Hereinafter, the reception quality is represented by the CIR (Carrier to Interference Ratio) of the primary receiver 21. The allowed transmission power of the secondary transmitter 10 is to be set to the maximum transmission power at which the CIR of the primary receiver 21 becomes a value equal to or more than a predetermined value. Accordingly, even when the secondary transmitter 10 transmits a signal at a frequency identical to that of the primary transmitter 20, the primary receiver 21 is capable of receiving the signal from the primary transmitter 20 while keeping the predetermined reception quality.

Further, as described below, the allowed transmission power of the secondary transmitter 10 is updated according to the measurement carried out at the sensor station 11.

The sensor station 11 measures the received power of the secondary signal from the secondary transmitter 10 to notify the measured received power to the received power estimation device 12 via the network 14. If the primary signal transmitted from the primary transmitter 20 arrives at the sensor station 11 at a sufficient power level, and thus it is possible for the sensor station 11 to measure the primary signal power, the sensor station 11 may measure also the received power of the primary signal and notify the measurement result to the received power estimation device 12 via the network 14.

Here, each of the secondary transmitter 10 and the sensor station 11 may be, for example, any one of a base station, a relay station, and a terminal station in a cellular system. Further, the sensor station 11 may be a dedicated sensor installed for the purpose of grasping a radio wave propagation state. A description is made below exemplifying a case where the secondary transmitter 10 is a base station, and the sensor station 11 is a dedicated sensor.

The received power estimation device 12 has a function of selecting a sensor station to be used for measurement, a function of compensating the received power estimate at a time when the secondary signal and the primary signal are received at the primary receiver using the measurement result of the received power of the sensor station, and a function of setting the allowed transmission power for allowing the secondary system to execute the frequency sharing. However, the present invention is not limited to the received power estimation device of a configuration having the above functions. Each of the above functions may be held by a separate device (e.g., the secondary transmitter 10, the sensor station 11, or another device). The received power estimation device is sometimes referred to as a spectrum manager. A configuration of the received power estimation device will be described below in detail.

The radio environment database 13 stores predetermined information about the primary system, the secondary system, and the sensor station (e.g., information about a position of the radio station, coverage of the radio station, transmission power, a height of antenna, and directivity of antenna). The radio environment database 13 preliminary estimates a path loss between one radio station and the other radio station (e.g., between the secondary transmitter 10 and the primary receiver 21, between the secondary transmitter 10 and the sensor station 11, between the primary transmitter 20 and the primary receiver 21, and between the primary transmitter 20 and the sensor station 11) using a predetermined propagation model including parameters of, for example, a distance between the radio stations and the height of the antenna. Then, the radio environment database 13 stores the results. The radio environment database 13 provides, as required, the information to a requestor (e.g., the received power estimation device 12, the secondary transmitter 10, and the sensor station 11). Meanwhile, some pieces of information may be integrated to be stored. Here, the radio environment database 13 may be a device integrally having a part or all of the functions of the received power estimation device 12.

The network 14 is the one over which the secondary transmitter 10, the sensor station 11, the received power estimation device 12, and the radio environment database 13 make communication one another. The network may be a core network closing to telecommunication carriers or may be a network common to a plurality of telecommunication carriers. Further, the network may be either one of a wired network or a radio network.

Figure 3:
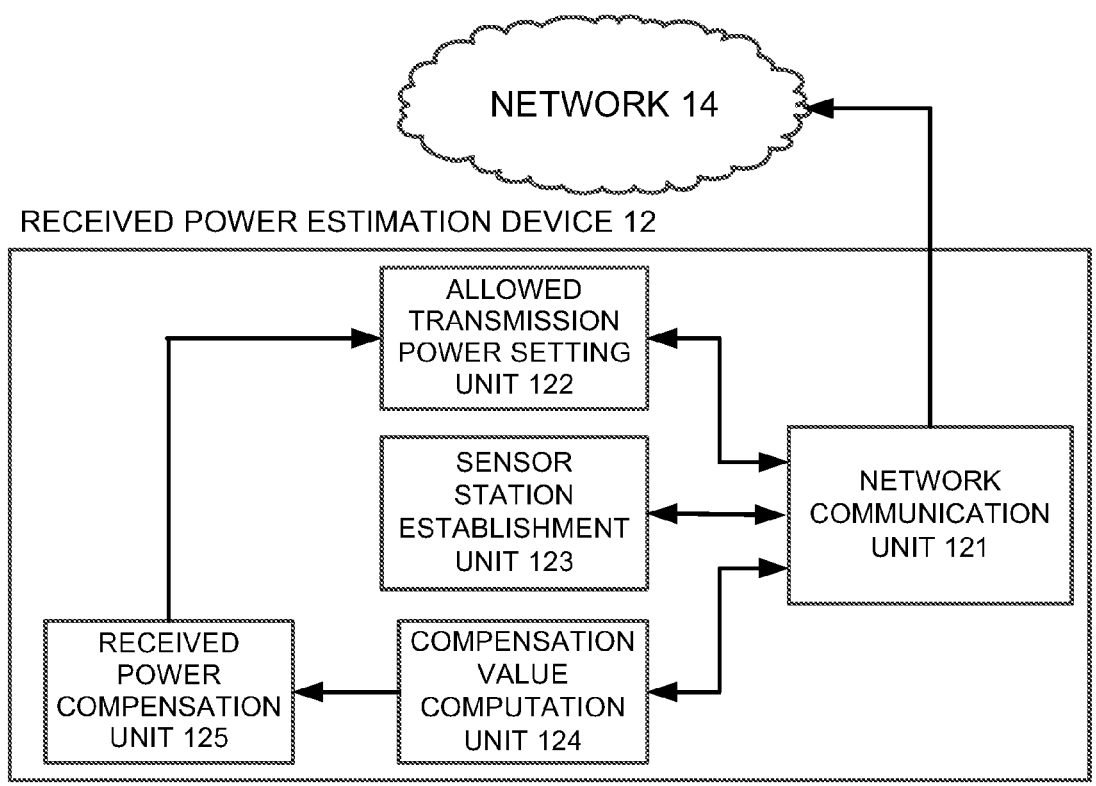
FIG. 3 is a block diagram illustrating an exemplary configuration of a received power estimation device according to the first embodiment of the present invention.

FIG. 3 is a block diagram illustrating a configuration of the received power estimation device 12. As shown in FIG. 3, the received power estimation device 12 includes a network communication unit 121, an allowed transmission power setting unit 122, a sensor station establishment unit 123, a compensation value computation unit 124, and a received power compensation unit 125.

The network communication unit 121 has a function of allowing each unit of the received power estimation device 12 to make communication with another device (e.g., the secondary transmitter 10, the sensor station 11, and the radio environment database 13) via the network 14.

Hereinafter, it is assumed that the following contents are obtained from the radio environment database 13. Namely, obtained are various path loss estimates and information about the primary system, the secondary system, and the sensor station, the information being necessary for the allowed transmission power setting unit 122, the sensor station establishment unit 123, the compensation value computation unit 124, and the received power compensation unit 125, (e.g., transmission power information, a transmission antenna gain, a transmission antenna height, position information, a reception antenna gain, and position information). Further, a portion or entirety of the information may be stored in the received power estimation device in advance.

Each unit will be described below in detail.

Initially, the allowed transmission power setting unit 122 receives a request for secondary use from the secondary transmitter 10 that requests secondary use of the frequency band of the primary system via the network communication unit 121 and calculates the allowed transmission power capable of being used at each available frequency for notification thereof.

A calculation method for calculating the allowed transmission power when the allowed transmission power setting unit 122 receives the request for secondary use from the secondary transmitter 10 will be described below. Meanwhile, the description will be made exemplifying a case where the number of frequencies targeted for the allowed transmission power setting is one. However, in a case where there is a plurality of frequencies, the same operations are to be provided to each of the frequencies.

The allowed transmission power setting unit 122 estimates received power of the primary signal and received power of the secondary signal at the primary receiver 21 using the path loss estimate from the primary transmitter 20 to the primary receiver 21 and the path loss estimate from the secondary transmitter 10 to the primary receiver 21, and sets the maximum transmission power whose CIR is a value equal to or more than a predetermined value as the allowed transmission power of the secondary transmitter 10. In other words, the allowed transmission power $P_{Sec,\ Max}$ is set in a manner as described below.

$$P_{Sec,Max}=(P_{Pri}+G_{Pri}^{Tx}-L_{Pri-Pri}+G_{Pri-Pri}^{Rx})-(G_{Sec}^{Tx}-L_{Sec-Pri}+G_{Sec-Pri}^{Rx})-\text{CIR}_{req}-q\sigma \quad \text{[Equation 1]}$$

Here, a unit of each member is dB or dBm. This is applied to also variables in the following description. $P_{Pri}$ represents actual transmission power of the primary transmitter 20. $G_{Pri}^{Tx}$ represents a transmission antenna gain of the primary transmitter 20. $L_{Pri-Pri}$ represents a path loss estimate from the primary transmitter 20 to the primary receiver 21. $L_{Sec-Pri}$ represents a path loss estimate from the secondary transmitter 10 to the primary receiver 21.

Further, $G_{Pri-Pri}^{Rx}$ and $G_{Sec-Pri}^{Rx}$ represent reception antenna gains of the primary receiver 21. More specifically, the $G_{Pri-Pri}^{Rx}$ is a gain in a primary signal arrival direction and the $G_{Sec-Pri}^{Rx}$ is a gain in a secondary signal arrival direction. The arrival direction of each signal is calculated by a positional relationship between the primary receiver 21 and the primary transmitter 20 and a positional relationship between the primary receiver 21 and the secondary transmitter 10. The antenna gain is thereby calculated.

Further, $\text{CIR}_{req}$ represents a CIR required for protection of the primary receiver 21. The $\text{CIR}_{req}$ is set for each primary system. The $\sigma$ represents a standard deviation about an estimation error of the CIR. q represents a coefficient corresponding to a probability capable of securing a request CIR. Therefore, $q\sigma$ corresponds to a margin provided to the allowed transmission power so as to allow the CIR of the primary receiver 21 to satisfy the request CIR at a predetermined probability. For example, when a CIR estimation error has a Gaussian distribution, if the request CIR is secured at 95%, q has a value of 1.645.

Meanwhile, (Equation 1) calculates an allowed transmission power for securing the request CIR at the predetermined probability in the singular primary receiver 21. In a case where there is a plurality of primary receivers 21 to be protected, the allowed transmission power of (Equation 1) is calculated for each primary receiver 21, and the minimum value among the calculation results can be set to the final allowed transmission power.

Thus obtained allowed transmission power is sent to the secondary transmitter 10 via the network 14. The secondary transmitter 10 sets transmission power equal to or less than the allowed transmission power.

The allowed transmission power setting unit 122 inputs a compensated received power estimate of the secondary signal or a compensated received power estimate of the primary signal from the below mentioned received power compensation unit 125 to reset the allowed transmission power of the secondary transmitter 10. Provided that the compensated received power estimate of the secondary signal is $I'_{Pri}$ and the compensated received power estimate of the primary signal is $C'_{Pri}$, the allowed transmission power $P'_{Sec,\ Max}$ reset is set by the following equation.

$$P'_{Sec,Max}=P_{Sec}+(C'_{Pri}-I'_{Pri})-\text{CIR}_{req}-q\sigma' \quad \text{[Equation 2]}$$

Here, it is assumed that $P_{Sec}$ represents an actual transmission power of the secondary transmitter 10, and that the $P_{Sec}$ is obtained from the secondary transmitter 10. $\sigma'$ is a standard deviation of an estimation error of $(C'_{Pri}-I'_{Pri})$ as a compensated CIR estimate value. The $\sigma'$ is set considering, for example, an error resulting from the compensation and a measurement error. Meanwhile, in a case where only the compensated received power estimate of the secondary signal is input from the received power compensation unit 125, the received power estimate of the primary signal before it is compensated is substituted for the compensated received power estimate of the primary signal.

Thus reset allowed transmission power is sent to the secondary transmitter 10 via the network 14. The secondary transmitter 10 sets transmission power equal to or less than the allowed transmission power.

The sensor station establishment unit 123 receives a notification of the frequency in use by the secondary transmitter 10 or a notification of the frequency that is determined to be used by the secondary transmitter 10. Then, the sensor station establishment unit 123 selects a sensor station for measurement of a radio signal among the plurality of sensor stations. The sensor station establishment unit 123 transmits a measurement request to the selected sensor station 11 to teach a frequency at which the measurement is to be carried out. A method for selecting the sensor station will be described below.

In the method for selecting the sensor station in the present embodiment, a sensor station located around the secondary transmitter 10 is selected among the plurality of sensor stations. More specifically, a received power estimate ($I_{SS}^{Est}$) at a time when the secondary signal transmitted from the secondary transmitter 10 is received by the sensor station and a received power estimate ($C_{SS}^{Est}$) at a time when the primary signal transmitted from the primary transmitter 20 is received by the sensor station are calculated. Then, a sensor station whose received power ratio (corresponding to $I_{SS}^{Est}-C_{SS}^{Est}$ in dB notation) is relatively large or a sensor station whose received power ratio is equal to or more than a predetermined value is selected. Here, it is possible to calculate the $I_{SS}^{Est}$, for example, by the following equation.

$$I_{SS}^{Est}=P_{Sec}+G_{Sec}^{Tx}-L_{Sec-SS}+G_{Sec-SS}^{Rx} \quad \text{[Equation 3]}$$

Here, $L_{Sec-SS}$ represents a path loss estimate between the secondary transmitter 10 and the sensor station 11. $G_{Sec-SS}^{Rx}$ represents a receiving antenna gain of the sensor station 11, i.e., a gain in a direction of the secondary transmitter 10. In cases where the secondary transmitter 10 has completed the transmission at a time when the sensor station was selected and where the received power estimation device 12 has obtained actual transmission power ($P_{Sec}$), the above equation is available. However, in cases where the received power estimation device 12 has not obtained the actual transmission power yet and where the secondary transmitter 10 has not started the transmission yet, the allowed transmission power is to be calculated using (Equation 1), and thereby the actual transmission power is substituted by the allowed transmission power in the equation.

The $C_{SS}^{Est}$ is capable of being calculated, for example, by the following equation.

$$C_{SS}^{Est}=P_{Pri}+G_{Pri}^{Tx}-L_{Pri-SS}+G_{Pri-SS}^{Rx} \quad \text{[Equation 4]}$$

Here, $L_{Pri-SS}$ represents a path loss estimate between the primary transmitter 20 and the sensor station 11. $G_{Pri-SS}^{Rx}$ represents a reception antenna gain of the sensor station 11, i.e., a gain in a direction of the primary transmitter 11.

As described above, causing the sensor station whose received power ratio is relatively large or the sensor station whose received power ratio is equal to or more than a predetermined value to perform measurement facilitates the received power measurement of the secondary signal as well as ensures compensation with decreased measurement error.

Further, in another method for selecting a sensor station located around the secondary transmitter 10, it is possible to select a sensor station as the sensor station 11 distant from the secondary transmitter 10 by a distance equal to or less than a predetermined value. Similarly, also in this case, the received power measurement of the secondary signal will be facilitated, resulting in realizing the compensation with decreased measurement error.

The sensor station establishment unit 123 transmits a measurement request to thus selected sensor station 11 and teaches a frequency at which measurement is to be carried out.

Then, the compensation value computation unit 124 receives a measured received power of the secondary signal measured by the sensor station 11 via the network 14, and, with the measurement result, calculates a compensation value to be used for the compensation of the received power estimate of the secondary signal in the primary receiver 21. Further, if it is possible to measure received power of the primary signal in the sensor station 11, a compensation value to be used for the compensation of the received power estimate of the primary signal in the primary receiver 21 is calculated in a similar manner. Here, the measurement result is the received power value measured at the sensor station 11. However, the measurement result may be, for example, a result of quantization of the received power value or another value having a proportional relationship with the received power (e.g., a correlation value between a pilot signal and a received signal).

More specifically, the compensation value computation unit 124 obtains the measured received power ($I_{SS}^{Meas}$) of the secondary signal measured at the sensor station 11 and calculates a differential value between thus obtained value and the received power estimate ($I_{SS}^{Est}$) of the secondary signal in the sensor station 11, the received power estimate ($I_{SS}^{Est}$) being shown in (Equation 3). Thus obtained differential value is set to a compensation value $\Delta_I$.

$$\Delta_I = I_{SS}^{Meas} - I_{SS}^{Est} \qquad \text{[Equation 5]}$$

Thus calculated compensation value $\Delta_I$ is sent to the received power compensation unit 125.

In cases where the received power of the primary signal is measurable in the sensor station 11 and where the compensation value computation unit 124 obtains a measurement value of the received power of the primary signal from the sensor station 11, it is possible to calculate a compensation value for the primary signal in a manner similar to the case of the secondary signal. More specifically, a differential value between a measured received power ($C_{SS}^{Meas}$) of the primary signal measured at the sensor station 11 and a received power estimate ($C_{SS}^{Est}$) of the secondary signal in the sensor station 11 shown by (Equation 4) is calculated. Then, the resulting value is set to a compensation value $\Delta_C$. The compensation value $\Delta_C$ is sent to also the received power compensation unit 125.

The received power compensation unit 125 compensates the received power estimate of the secondary signal in the primary receiver 21 and the received power estimate of the primary signal using the compensation value obtained from the compensation value computation unit 124. Initially, the received power estimate ($I_{Pri}^{Est}$) of the secondary signal in the primary receiver 21 is calculated by the following equation.

$$I_{Pri}^{Est} = P_{Sec} + G_{Sec}^{Tx} - L_{Sec-Pri} G_{Sec-Pri}^{Rx} \qquad \text{[Equation 6]}$$

Thus obtained $I_{Pri}^{Est}$ is compensated using the following equation.

$$I'_{Pri} = I_{Pri}^{Est} + w_I \Delta_I \qquad \text{[Equation 7]}$$

Here, $I'_{Pri}$ is identical to the compensated received power estimate of the secondary signal that is used in (Equation 2), and $w_I$ is a weight coefficient ($0 \leq w_I \leq 1$) of the compensation value.

Here, the weight coefficient $w_I$ is determined according to, for example, a correlation between a propagation environment from the secondary transmitter 10 to the sensor station 11 and a propagation environment from the secondary transmitter 10 to the primary receiver 11. For example, in a case where both of a propagation path from the secondary transmitter 10 to the sensor station 11 and a propagation path from the secondary transmitter 10 to the primary receiver 21 are blocked by the same planimetric feature, the weight coefficient can be set to a large value. To the contrary, in a case where only one of the propagation paths is blocked, the weight coefficient can be set to a small value.

The compensated received power estimate of the secondary signal obtained in a manner as set forth above is output to the allowed transmission power setting unit 122.

In a manner similar to the case of the secondary signal, the received power estimate ($C_{Pri}^{Est}$) of the primary signal in the primary receiver 21 is calculated by the following equation.

$$C_{Pri}^{Est} = P_{Pri} + G_{Pri}^{Tx} - L_{Pri-Pri} + G_{Pri-Pri}^{Rx} \qquad \text{[Equation 8]}$$

Thus obtained $C_{Pri}^{Est}$ is compensated using the following equation.

$$C'_{Pri} = C_{Pri}^{Est} + w_C \Delta_C \qquad \text{[Equation 9]}$$

Here, $C'_{Pri}$ is identical to the compensated received power estimate of the primary signal, the compensated received power estimate being used in (Equation 2), and $w_C$ is a weight coefficient ($0 \leq w_C \leq 1$) of the compensation value. This value is also output to the allowed transmission power setting unit 122 as the compensated received power estimate of the primary signal.

Figure 4:
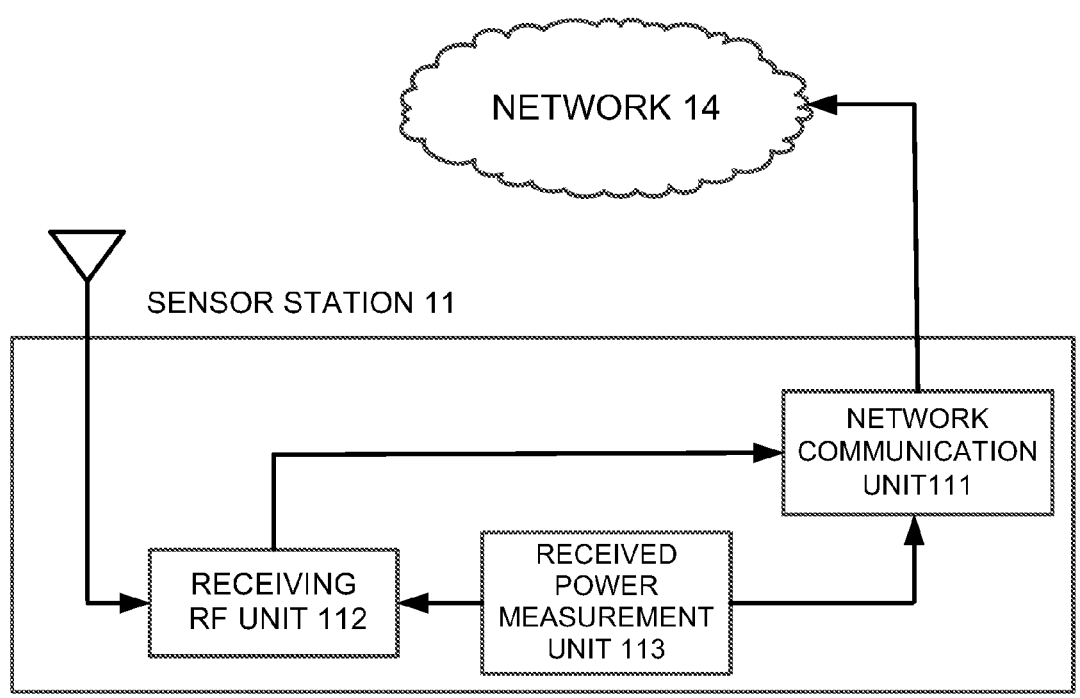
FIG. 4 is a block diagram illustrating an exemplary configuration of the sensor station.

FIG. 4 is a block diagram illustrating an exemplary configuration of the sensor station 11. The sensor station 11 includes a network communication unit 111, a receiving RF unit 112, and a received power measurement unit 113. It is noted that components that are not directly relating to the present invention (e.g., a circuit for making radio communication between a base station and a terminal in a case where the sensor station 11 is not a dedicated sensor station but a base station) are omitted from FIG. 4 for the sake of a simple description.

The network communication unit 111 is used for allowing the sensor station 11 to make communication with another device (e.g., the received power estimation device 12) via the network 14.

The receiving RF unit 112 includes therein, for example, a band pass filter, a low-noise amplifier, a frequency conversion unit for carrying out frequency conversion between a RF (Radio Frequency) band signal and a baseband signal, and an analog-digital conversion unit (Analog to Digital conversion unit).

In the receiving RF unit 112, a measuring frequency taught by a measurement request from the received power estimation device 12 via the network 14 is set as a frequency (a center frequency, a frequency band width) of the band pass filter to limit reception of radio wave outside the measured frequency band among radio signals input from the antenna. The receiving RF unit 112 further converts a signal of the extracted measured frequency band into a digital baseband signal to output the resulting signal to the received power measurement unit 113.

It is noted that the "measuring frequency" is not a frequency for allowing the sensor station 11 to make radio communication with another radio station but is a frequency for measuring the signals transmitted from the secondary transmitter 10 and the primary transmitter 20. Further, the measurement frequency designated by the measurement request may be set independently for each of the frequency for measuring the secondary signal and the frequency for measuring the primary signal.

Depending on the measurement method of the received power measurement unit 113, the RF signal or an IF (Intermediate Frequency) signal may be input.

The received power measurement unit 113 receives the digital baseband signal of the measuring frequency from the receiving RF unit 112 to calculate received power of a signal to be measured. Here, the signal to be measured is the secondary signal or the primary signal.

The measurement method of the received power may be any method in so far as the method is capable of measuring the received power of the secondary signal or the received power of the primary signal.

For example, in a case where another signal (e.g., the primary signal) is small enough with respect to the signal to be measured (e.g., the secondary signal), direct measurement of the received power of the measuring frequency and subtraction of noise power contained in the frequency band ensure the measurement of the received power of the signal to be measured. Further, in a case where a preliminary known pilot signal is contained in the signal to be measured, it is also possible to measure the received power using the pilot signal at the sensor station 11.

The sensor station 11 notifies the measured received power to the received power estimation device 12.

Figure 5:
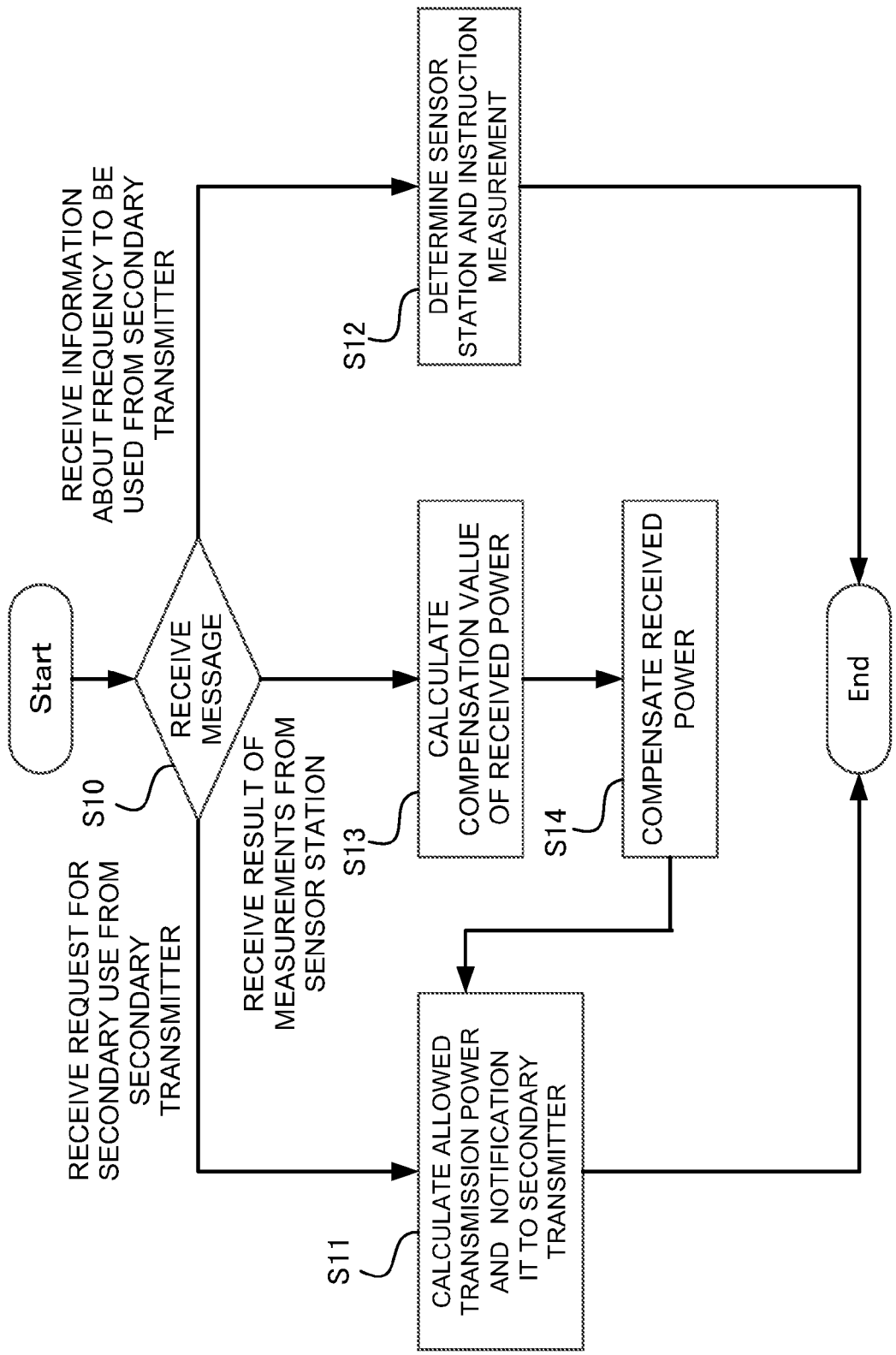
FIG. 5 is a flow chart illustrating exemplary processing carried out by the received power estimation device.

FIG. 5 is a flow chart illustrating exemplary operations of the received power estimation device 12. Initially, the network communication unit 121 of the received power estimation device 12 receives any one of the request for secondary use (including information about, for example, a frequency, and time) transmitted from the secondary transmitter 10, information about a frequency in use or a frequency to be used (e.g., transmission power, a frequency, and time) transmitted from the secondary transmitter 10, and a measurement result (the measured received power of the secondary signal and the measured received power of the primary signal) transmitted from the sensor station 11 (step S10).

In a case where the message received at step S10 is a request for secondary use transmitted from the secondary transmitter 10, setting of allowed transmission power is carried out. More specifically, the allowed transmission power setting unit 122 calculates the allowed transmission power available for each available frequency for notification thereof. The allowed transmission power is obtained in the following manner. The received power of the primary signal and the received power of the secondary signal at the primary receiver 21 are estimated using the path loss estimate from the primary transmitter 20 to the primary receiver 21 and the path loss estimate from the secondary transmitter 10 to the primary receiver 21. Subsequently, the maximum transmission power whose CIR is equal to or more than a predetermined value is calculated. Then, the resulting maximum transmission power is set to the allowed transmission power of the secondary transmitter 10 (step S11).

In a case where the message received at step S10 is information about the frequency in use or the frequency to be used, the information being transmitted from the secondary transmitter 10, the sensor station establishment unit 123 selects a sensor station 11 for measurement of the secondary signal transmitted from the secondary transmitter 10 to notify the measurement request to the selected sensor station (step S12).

The sensor station is selected among a plurality of sensor stations. The sensor station to be selected is the one located around the secondary transmitter 10. More specifically, the sensor station establishment unit 123 selects a sensor station whose ratio between the received power estimate at a time when the secondary signal transmitted from the secondary transmitter 10 is received by the sensor station and the received power estimate at a time when the primary signal transmitted from the primary transmitter 20 is received by the sensor station is relatively large or a sensor station whose ratio is equal to or more than a predetermined value. According to another selection method, it is possible to select a sensor station as the sensor station 11 distant from the secondary transmitter 10 by a distance equal to or less than a predetermined value.

In a case where the message received at step S10 is the measurement result transmitted from the sensor station 11, the compensation value computation unit 124 calculates a compensation value to be used for compensation of the received power estimate of the secondary signal in the primary receiver 21 using the obtained received power (step S13). The compensation value is a differential value between the measured received power of the secondary signal that was measured at the sensor station 11 and the received power estimate of the secondary signal in the sensor station 11. Further, if it is possible to measure the received power of the primary signal in the sensor station 11, it is also possible to calculate, in the similar manner, the compensation value to be used for compensation of the received power estimate of the primary signal in the primary receiver 21. The compensation value also is a differential value between the measured received power of the primary signal that was measured at the sensor station 11 and the received power estimate of the primary signal in the sensor station 11.

Then, the received power compensation unit 125 compensates the received power estimate of the secondary signal, using the compensation value for the secondary signal, by weighing and adding the compensation value to the received power estimate of the secondary signal in the primary receiver 21 (step S14). Further, the received power compensation unit 125 compensates the received power estimate of the primary signal, using the compensation value for the primary signal, by weighing and adding the compensation value to the received power estimate of the primary signal in the primary receiver 21.

Subsequently, by using the compensated received power of the secondary signal and the compensated received power of the primary signal, the received power compensation unit 125 resets the allowed transmission power of the secondary transmitter 10.

Figure 6:
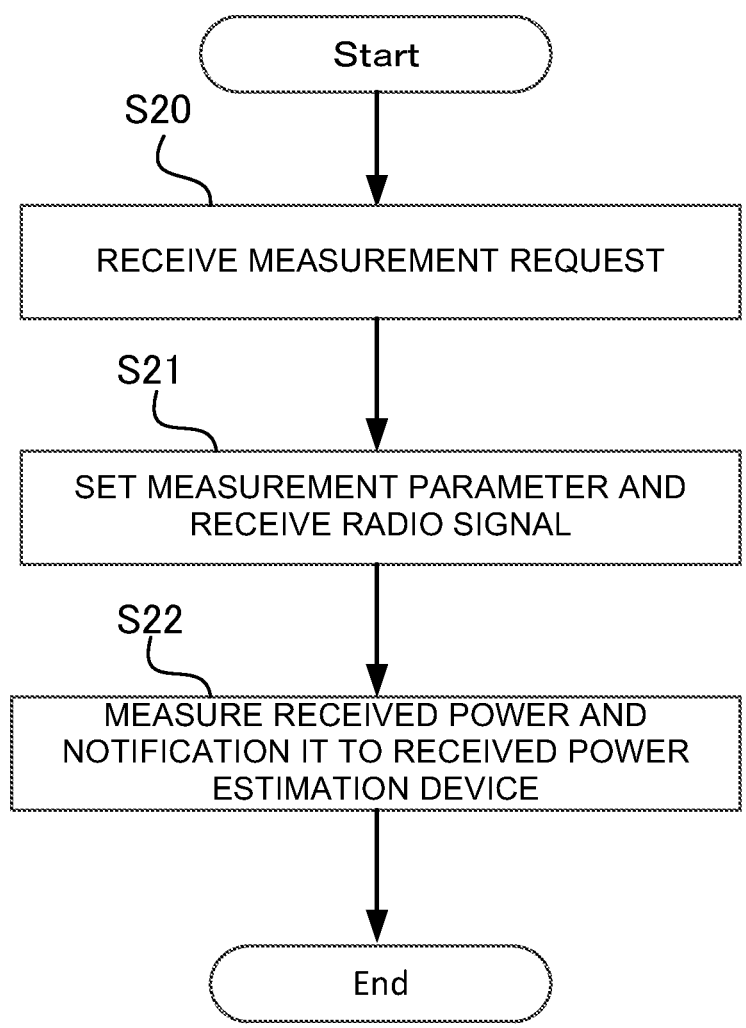
FIG. 6 is a flow chart illustrating exemplary processing carried out by the sensor station.

FIG. 6 is a flow chart illustrating exemplary operations of the sensor station 11. The network communication unit 111 of the sensor station 11 receives a measurement request from the received power estimation device 12 (step S20).

Then, the receiving RF unit 112 of the sensor station 11 sets a passing band of the bandpass filter to a frequency designated by the measurement request at which a radio signal at the frequency is received. Then, the receiving RF unit 112 of the sensor station 11 receives the radio signal. The received radio signal is converted into a digital baseband signal (step S21). Subsequently, the received power measurement unit 113 of the sensor station 11 measures the received power of the secondary signal and the received power of the primary signal using the digital baseband signal to be measured and notifies the measurement result to the received power estimation device 12 via the network communication unit 111 and the network 14 (step S22).

According to the above described first embodiment, when the received power estimate of the secondary signal that interferes with the primary receiver is compensated using measured received power of the secondary signal measured at the sensor station, the received power of the secondary signal measured at the sensor station in the periphery of the secondary transmitter is used. Specifically, any one of a sensor station whose ratio between an estimate value of the received power of the secondary signal calculated using the propagation model and an estimate value of the received power of the primary signal is relatively large or a sensor station whose ratio is equal to or more than the predetermined value, or a sensor station distant from the secondary transmitter by a distance equal to or less than a predetermined value is selected for measurement. Accordingly, it becomes possible to carry out the measurement under the environment that the received power of the secondary signal is larger than the received power of the primary signal. This ensures measurement and compensation, with the measurement error for the secondary signal being decreased. As a result, it is possible to decrease the estimation error of the CIR and make a margin required to be set to the allowed transmission power of the secondary transmitter smaller. This achieves increase of the allowed transmission power.

In the above description, the CIR of the primary receiver is used as reception quality for setting the allowed transmission power. However, it is also possible to set the allowed transmission power whose CINR is equal to or more than a predetermined value and to set the allowed transmission power whose interfered amount at the primary receiver equal to or less than a predetermined amount. Also, it is possible to set the allowed transmission power such that degradation levels of the CIR and the CINR of the primary receiver are suppressed to a degree equal to or less than a predetermined level, the degradation being generated by the transmission at the secondary transmitter.

In the above description, the number of sensor stations 11 is assumed to be one as shown in FIG. 1. However, it is also possible to use a plurality of sensor stations.

Figure 7:
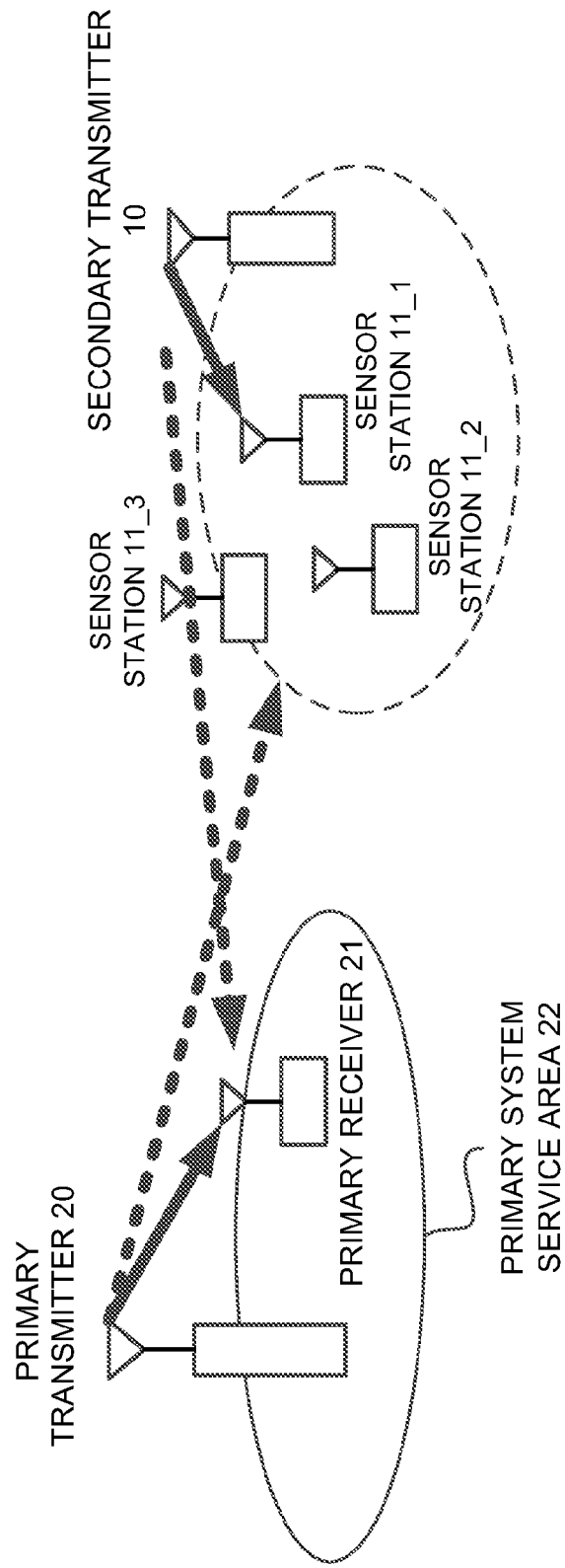
FIG. 7 illustrates a positional relationship between a primary system, a secondary system, and sensor stations in a case where there is a plurality of sensor stations.

FIG. 7 illustrates an example of a case where a plurality of sensor stations (11_1, 11_2, 11_3) carries out measurement of the secondary signal. In this case, the sensor stations are selected based on a criterion similar to that of the above method. That is, it is possible to select a plurality of sensor stations whose ratio between the estimate of the received power of the secondary signal, the estimate being calculated using the propagation model, and the estimate value of the received power of the primary signal is relatively large, a plurality of sensor stations whose ratio is equal to or more than the predetermined value, or a plurality of sensor stations as the sensor stations 11 each distant from the secondary transmitter 10 by a distance equal to or less than a predetermined value.

In a case where there is the plurality of sensor stations, the compensation value computation unit 124 of the received power estimation device 12 is capable of calculating the compensation value $\Delta_I$ shown in (Equation 5) for each of the sensor stations and transmitting an average value thereof to the received power compensation unit 125 as the final compensation value. The compensation value may be the average value as well as may be an average value added with weight according to the above received power ratio for each sensor station.

Also, in the above description, the secondary transmitter 10 is notified of the allowed transmission power for each frequency from the received power estimation device 12 and notifies, after determining actual transmission power and a frequency based on the notification, thus determined actual transmission power and the frequency to the received power estimation device 12. However, in cases where the secondary transmitter 10 frequently updates the actual transmission power to be used under the transmission power control or where the secondary transmitter 10 frequently changes the frequency to be used, such a case is assumed that the notification is not made due to difficulty in notification to the received power estimation device 12 for each update of the actual transmission power or the frequency. In such cases, the received power estimation device 12 has a problem of impossible grasp on the frequency to be used by the secondary transmitter 10 and the actual transmission power of the secondary transmitter 10. The first embodiment of the present invention is applicable also to such cases.

Initially, in a case where the frequency to be used by the secondary transmitter 10 is unknown in the received power estimation device 12, the sensor station establishment unit 123 notifies the sensor station 11 of, not the frequency for causing the sensor station 11 to perform measurement, but a candidate of frequency possibly used by the secondary transmitter 10. For example, the candidate may be determined in a manner that, when the allowed transmission power of the secondary transmitter 10 is determined for each frequency, the frequency at which the allowed transmission power was equal to or more than the predetermined value can be selected as the candidate. Further, at the sensor station 11 after being notified of the candidate from the received power estimation device 12, by measuring the received power of the candidate at each frequency, the frequency at which the received power is equal to or more than the predetermined value can be determined as the frequency to be used by the secondary transmitter 10 with high probability. The sensor station 11 in the first embodiment of the present invention is the one located around the secondary transmitter 10, so that the received power by the secondary signal becomes large at the sensor station. As a result, the above determination becomes possible.

Next, in a case where the actual transmission power to be used by the secondary transmitter 10 is unknown in the received power estimation device 12, the allowed transmission power calculated in advance by the received power estimation device 12 is used instead of the actual transmission power used in each equation for the sake of the reset of the allowed transmission power of (Equation 2), the estimation of the received power of the secondary signal in the sensor station 11 shown in (Equation 3), and the estimation of the received power of the secondary signal in the primary receiver 21 shown in (Equation 6). At the time, an error occurs between the allowed transmission power and the actual transmission power of the secondary transmitter 10. Therefore, in addition to the estimation error of the path loss, an estimation error of the actual transmission power occurs in (Equation 3) and (Equation 6). However, calculation of the compensation value shown in (Equation 5) using the received power of the secondary signal that was measured in the sensor station 11 enables reflection of the influence of the estimation error of the actual transmission power in the compensation value. As a result, in compensation of the received power of the secondary signal of (Equation 7) and reset of the allowed transmission power of (Equation 2), it is possible to consider, not only the influence due to the estimation error of the path loss, but also the influence of the estimation error of the actual transmission power.

Further, in a case where the actual transmission power of the secondary transmitter 10 is unknown, at the time of the compensation of the received power of the secondary signal as shown in (Equation 7), it is possible to determine the weight coefficient $w_I$ according to a degree of the assumed path loss estimation error and the actually assumed transmission power estimation error. For example, in a case where the actually assumed transmission power estimation error is larger than the assumed path loss estimation error, $w_I$ is set to a large value (a value closer to 1 than $w_I$ in the case where the actual transmission power is known). To the contrary, in a case where the assumed path loss estimation error is larger than the actually assumed transmission power estimation error, $w_I$ is set to a small value (a value closer to $w_I$ in the case where the actual transmission power is known).

An example of the assumed path loss estimation error includes variance of the propagation estimation error in a case of using a predetermined propagation model. In another example of the method, a value multiplied by a correlation between an error of the path loss estimate for the propagation between the secondary transmitter 10 and the primary receiver 21 and an error of the path loss estimate for the propagation between the secondary transmitter 10 and the sensor station 11 may also be set to the assumed path loss estimation error. Further, it is possible to determine the actually assumed transmission power estimation error based on a differential value between the transmission power typically used at the secondary transmitter 10 and the allowed transmission power.

The above setting of $w_I$ produces the following effects. Initially, in a case where the estimation error of the actual transmission power is relatively large, the large error will be equally included in the error of the received power estimate of the secondary signal in the primary receiver 21 and the error of the received power estimate at the sensor station 11 in the periphery of the secondary transmitter 10, respectively. As a result, the compensation value $\Delta_I$ of (Equation 5) calculated using the measured received power at the sensor station 11 in the periphery of the secondary transmitter 10 becomes more reliable. In the light of the above, setting of $w_I$ to a large value ensures better reflection of the compensation value $\Delta_I$ to (Equation 7).

In a case where the assumed path loss estimation error is relatively large in comparison with the actually assumed transmission power estimation error and thus becomes a dominant error factor, setting of the value close to $w_I$ in the case where the actual transmission power is known will achieve the compensation mainly targeted to the path loss estimation error.

Additionally, in a case where the actual transmission power of the secondary transmitter 10 is unknown, it is possible to employ a different sensor station for each of the sensor station for measurement for compensating the estimation error of the path loss and the sensor station for measurement for compensating the estimation error of the actual transmission power.

For example, sensor stations located on or in the periphery of a straight line joining the secondary transmitter 10 and the primary receiver 21 are made as candidates of the former sensor station for measurement for compensating the estimation error of the path loss. Among those, a sensor station close to the secondary transmitter 10 is selected. To the contrary, the latter sensor station for measurement for compensating the estimation error of the actual transmission power may be a sensor station other than the sensor stations on or in the periphery of the straight line. The selection is simply made to a sensor station located close to the secondary transmitter 10. In (Equation 7) where calculation was performed using the measured received power at each sensor station, the weight $w_I$ for the compensation value $\Delta_I$ is set close to $w_I$ in the case where the actual transmission power is known at the former sensor station, whereas, the weight $w_I$ for the compensation value $\Delta_I$ is set closer to 1 than $w_I$ in the case where the actual transmission power is known at the latter sensor station. Then, the value is normalized by the sum such that the sum of both weights becomes 1. Accordingly, the respective weights are obtained.

As described above, when the estimation error of the path loss is compensated, a sensor station on or in the periphery of the straight line joining the secondary transmitter 10 and the primary receiver 21 is selected. This enables selection of a sensor station having a high correlation between the propagation between the secondary transmitter 10 and the primary receiver 21 and the propagation between the secondary transmitter 10 and the sensor station. As a result, it becomes possible to compensate the path loss estimation error more accurately. Meanwhile, the estimation error of the actual transmission power does not depend on the propagation path. Therefore, use of the sensor station closer to the secondary transmitter 10 ensures measurement with less influence of the primary signal. In other words, it becomes possible to carry out compensation by appropriately combining the compensation of the estimation error of the path loss and the compensation of the estimation error of the actual transmission power.

As described above, in the present embodiment, in a case where the actual transmission power of the secondary transmitter 10 is unknown, it is possible to compensate also the received power estimation error resulting from the estimation error thereof. It is further possible to estimate also transmission power of the secondary transmitter 10. A method thereof will be described below in detail.

Initially, the received power estimation device 12 causes the secondary transmitter 10 to carry out transmission at a predetermined actual transmission power in advance and causes the sensor station 11 to measure received power of the secondary signal. Then, the received power estimation device 12 stores the measured received power. If the secondary transmitter 10 is currently in operation and the actual transmission power is unknown, the same sensor station 11 is caused to measure the received power of the secondary signal. The received power estimation device 12 calculates a difference between the measured received power while the secondary transmitter 10 is in operation and the measured received power at advance transmission. The resulting difference is added to the predetermined actual transmission power. This enables estimation of the current actual transmission power.

However, magnitude of the radio signal of the primary signal and the radio signal of another secondary transmitter therearound differs in each of the time during the secondary transmitter 10 carries out the advance transmission and the time during the secondary transmitter 10 is in operation. This raises a concern about the influence on the received power measurement. In the present embodiment, however, the sensor station in the periphery of the secondary transmitter 10 is caused to carry out the measurement. Therefore, it becomes possible to carry out the measurement with less influence by the surrounding radio signals.

Second Embodiment

A second embodiment of the present invention differs from the first embodiment only in a sensor station establishment unit 123 of the received power estimation device 12. Specifically, the second embodiment relates to a method for selecting a sensor station in a case where there is a plurality of secondary transmitters. To simplify the description, only components different from those of the first embodiment will be described below.

Figure 8:
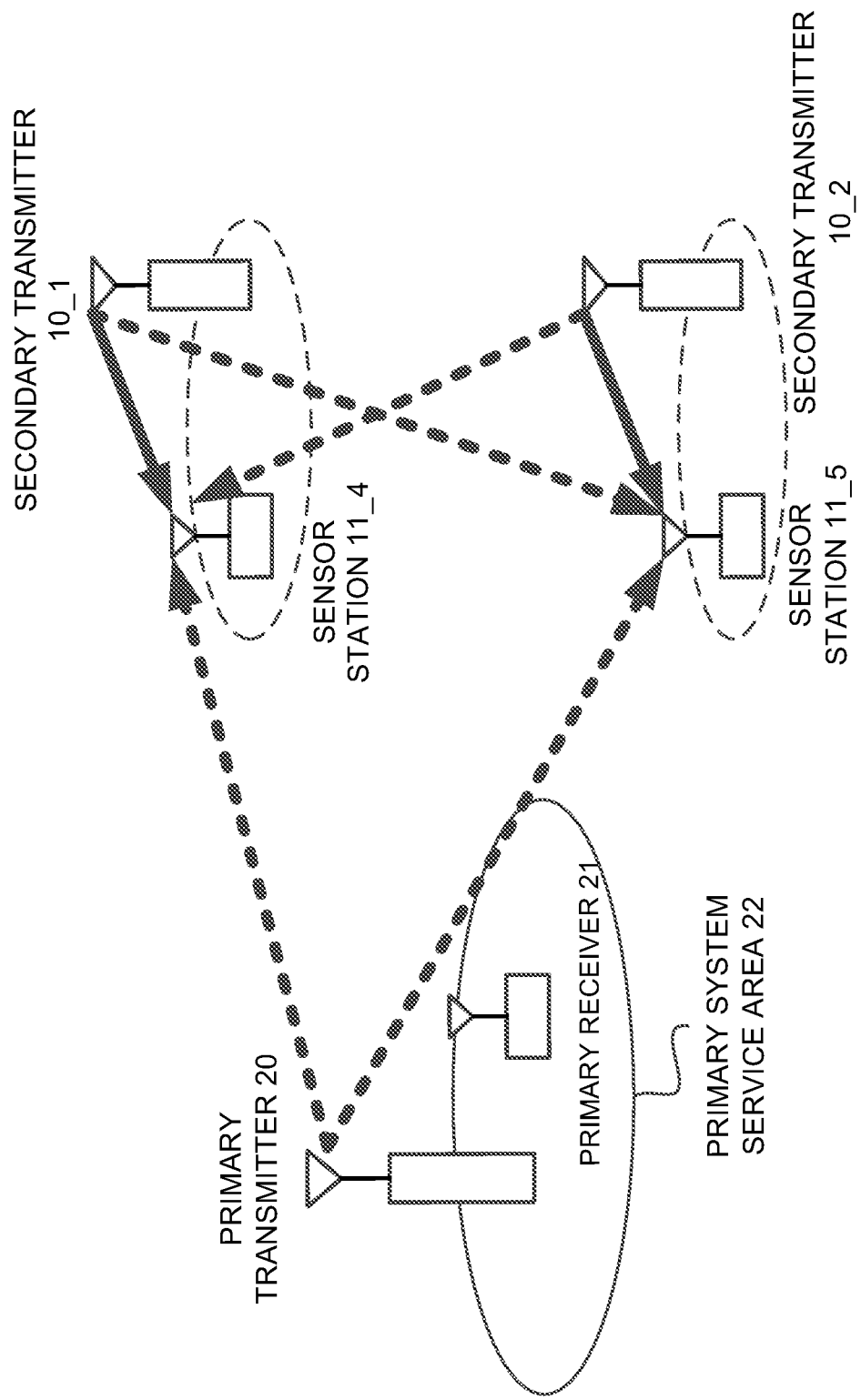
FIG. 8 illustrates a positional relationship between a primary system, a secondary system, and sensor stations according to a second embodiment of the present invention.

FIG. 8 illustrates a positional relationship between a primary system, a secondary system, and sensor stations according to the second embodiment of the present invention. Different from FIG. 1, there is a plurality of secondary transmitters (FIG. 2 exemplarily shows two sensor stations such as 10_1 and 10_2). Also, sensor stations 11_4, 11_5 are illustrated as sensor stations in the periphery of each respective secondary transmitter.

As shown in FIG. 8, in a case where there is the plurality of secondary transmitters 10_1 and 10_2, each sensor station receives, in addition to a desired secondary signal and primary signal that are to be measured, a signal from the other secondary transmitter. This affects on a measurement error of the desired secondary signal to be measured.

Figure 9:
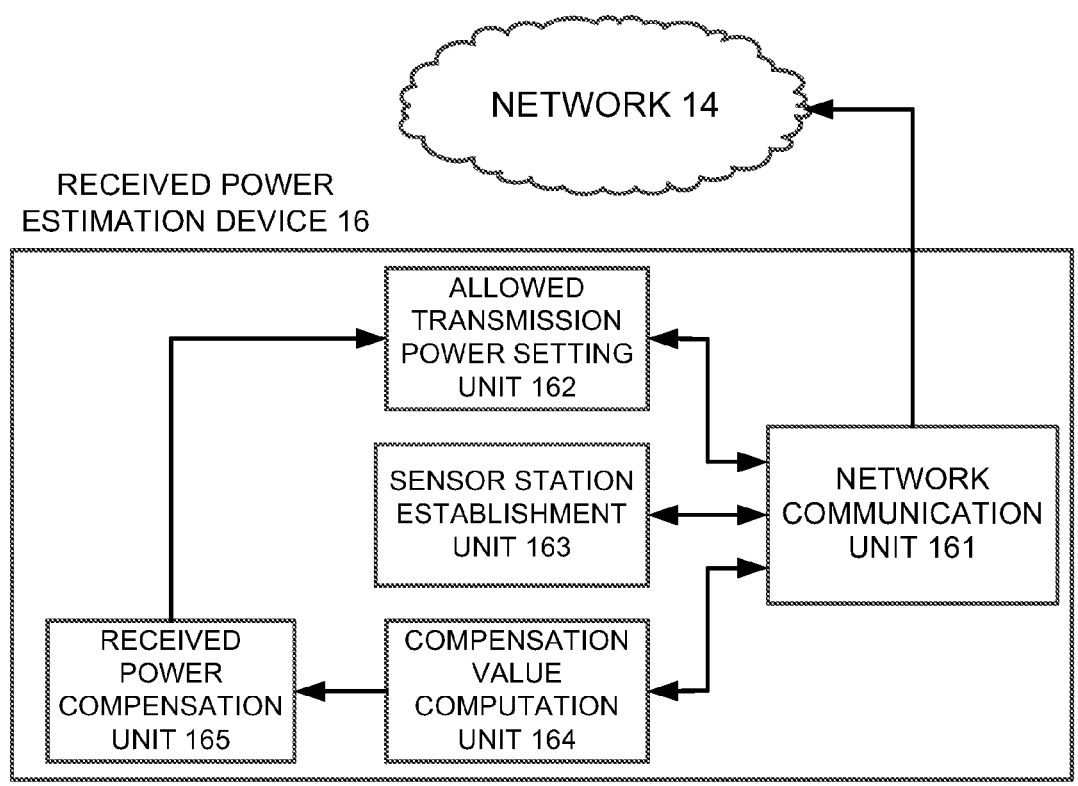
FIG. 9 is a block diagram illustrating an exemplary configuration of a received power estimation device according to the second embodiment of the present invention.

FIG. 9 illustrates a configuration of a received power estimation device 16 according to the present embodiment. The received power estimation device 16 includes a network communication unit 161, an allowed transmission power setting unit 162, a sensor station establishment unit 163, a compensation value computation unit 164, and a received power compensation unit 165.

The network communication unit 161 has a function identical to that of the network communication unit 121 of the received power estimation device 12.

The sensor station establishment unit 163 determines a sensor station for measurement in the following manner.

Initially, the sensor station establishment unit 163 calculates an estimate of the received power of the secondary signal at the sensor station for each secondary transmitter using the propagation model. Similarly, the sensor station establishment unit 163 calculates an estimate of the received power of the primary signal using the propagation model. Then, the sensor station establishment unit 163 calculates a ratio between the received power estimate for a certain secondary signal and the other received power (the sum of the received power of the other secondary signal and the received power of the primary signal). This calculation is carried out for all the secondary signals (the secondary transmitters 10_1 and 10_2) received by the sensor station (e.g., 11_4). Accordingly, a sensor station (e.g., the sensor station 11_4) whose received power ratio for the signal of the secondary transmitter 10_1 is relatively larger than the received power ratio at the other sensor station (e.g., the sensor station 11_5) is selected as a station for measurement. Alternatively, a sensor station whose received power is equal to or more than a predetermined value is selected as the station for measurement.

In another method for selecting a sensor, it is also possible to select a sensor station in the following manner. Namely, a distance between each secondary transmitter and each sensor station is calculated and thereby a sensor station distant from the secondary transmitter 10_1 by a distance equal to or less than a predetermined value as well as distant from the other secondary transmitter 10_2 by a distance equal to or more than a predetermined value is selected. Further, it is possible to select a sensor station whose ratio between the distance from the secondary transmitter 10_1 and the distance from the other secondary transmitter 10_2 is a value equal to or less than a predetermined value.

Then, the compensation value computation unit 164 calculates a compensation value for each respective secondary signal using a measured received power at each sensor station and outputs the resulting value to the received power compensation unit 165.

The received power compensation unit 165 carries out compensation of the received power estimate in the primary receiver 21 for each secondary signal using the compensation value calculated by the compensation value computation unit 164. Thus compensated received power estimate of each secondary signal is output to the allowed transmission power setting unit 162.

The allowed transmission power setting unit 162 treats the sum of the received power estimates of the respective secondary signals input from the received power compensation unit 125 as the received power $I'_{Pri}$ due to an interference signal from the secondary system in (Equation 2). However, the sum of the received power estimates of the respective secondary signals is a value obtained such that a true value of the received power estimate of the respective secondary signals is summed to be converted into a value in dB notation. In the present embodiment, there is the plurality of secondary transmitters 10_1 and 10_2. Resetting of the allowed transmission power based on a difference between a requesting value of the current CIR and a requesting value of the CIR may be performed with respect to each secondary transmitter using (Equation 2) or may be performed with respect to either one of the secondary transmitters using another equation. A case where the allowed transmission power is reset with respect to the each former secondary transmitter using (Equation 2) corresponds to resetting performed such that the differential value between the requesting value of the current CIR and the requesting value of the CIR is uniformly increased or decreased between the secondary transmitters. In a case where the allowed transmission power is reset with respect to the either one of the latter secondary transmitters, the reset CIR is set to the allowed transmission power satisfying (CIR$_{req}$-qσ'). This ensures allowing the requesting value of the CIR to satisfy the prescribed probability even after the resetting thereof.

According to the second embodiment as described above, when the received power estimate of the secondary signal that interferes with the primary receiver is compensated using the measured received power of the secondary signal measured at the sensor station, a sensor station located in the periphery of a certain secondary transmitter and receiving less influence of a signal from the other secondary transmitter is selected for measurement. This ensures measurement of the secondary signal in an environment where a received power for a desired secondary signal becomes larger than the other received power (the sum of received power of the other secondary signal and received power of the primary signal). As a result, measurement and compensation with less measurement error for the secondary signal will be achieved. This results in decrease of the estimation error of the CIR and minimization of the margin required to be set to the allowed transmission power of the secondary transmitter. Accordingly, the allowed transmission power can be increased.

Further, in the present embodiment, use of the sensor station whose received power of a certain secondary signal is larger enough than received power of the other secondary signal for measurement ensures elimination of the configuration that a plurality of secondary signals are separately measured in the sensor station. Generally, in a case where the received power of each of a plurality of concurrently transmitted secondary signals is measured, it is possible to measure it using a pilot signal unique to each signal, whereas, in a case where each transmitter belongs to the same radio system, a pilot signal unique to each secondary transmitter may not be used. Even in a case where the pilot signal unique to each secondary transmitter is used, if a pilot signal sequence is short, it may possibly be difficult to carry out the measurement of the received power accurately. In the present embodiment, it is possible to eliminate necessity of such a configuration that the plurality of secondary signals is measured one by one. This simplifies the configuration of the sensor station.

Third Embodiment

A third embodiment of the present invention differs from the second embodiment in that measurement at a sensor station in the periphery of the primary receiver is further utilized in addition to the measurement at the sensor station in the periphery of the secondary transmitter. To simplify the description, only components different from those of the second embodiment will be described below.

Figure 10:
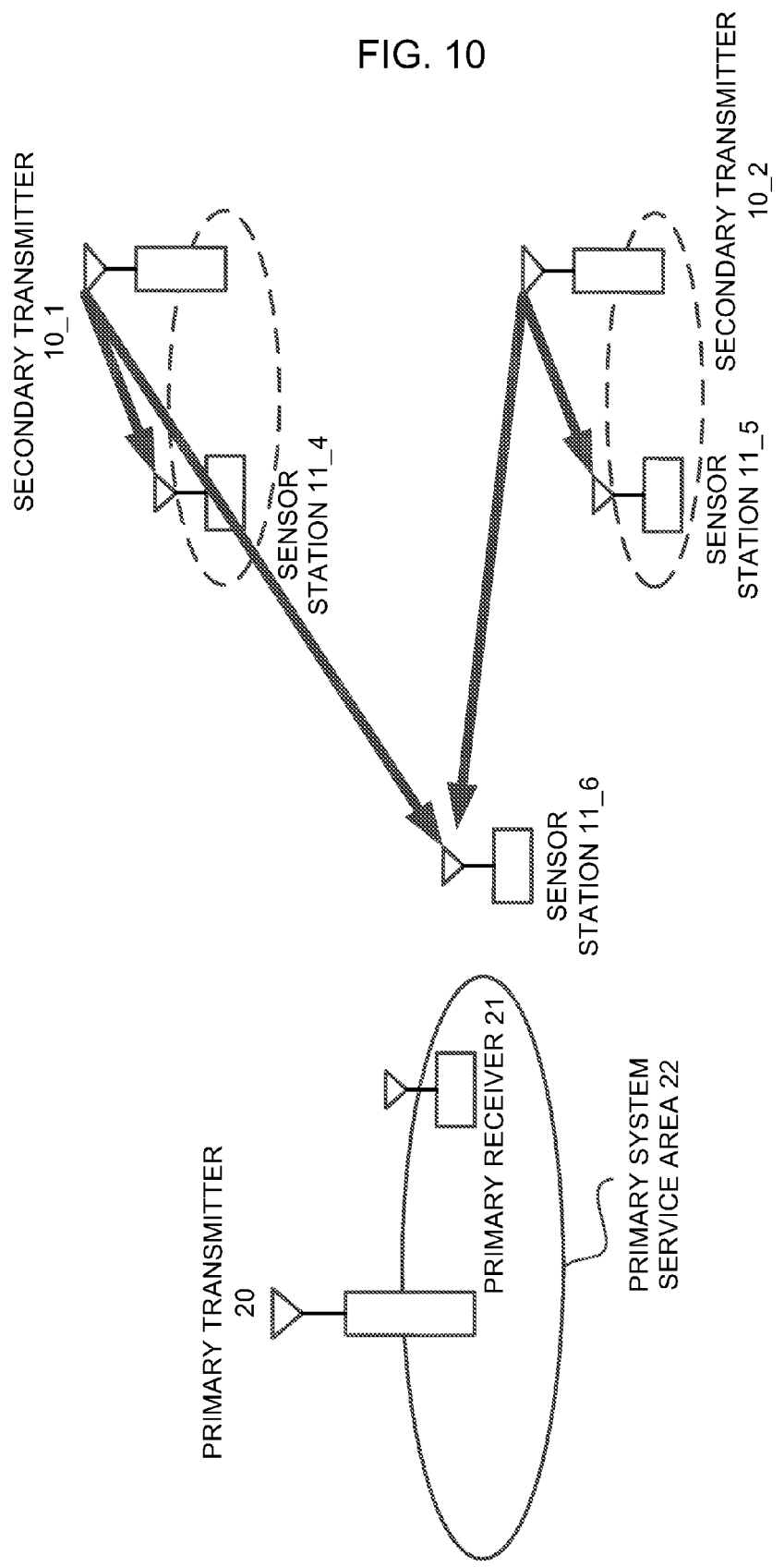
FIG. 10 illustrates a positional relationship between a primary system, a secondary system, and sensor stations according to a third embodiment of the present invention.

FIG. 10 illustrates a positional relationship between a primary system, a secondary system, and sensor stations according to the third embodiment of the present invention. FIG. 10 illustrates, in addition to FIG. 8, a sensor station 11_6 in the periphery of the primary receiver.

When a plurality of secondary signals is concurrently transmitted, although the sensor station 11_6 cannot measure the received power of each secondary signal separately, the sensor station 11_6 can measure the received power of the sum of the plurality of secondary signals. It is possible to calculate the sum of the received power of the secondary signals by measuring, for example, the received power of a certain frequency band (the received power of the sum of the plurality of secondary signals, the primary signal, and the noise signal) to subtract therefrom the received power and the noise power of the primary signal. It is noted that the primary signal power is measurable by using the pilot signal unique to the primary signal.

In the present embodiment, estimation and compensation of the received power of the secondary signal at the primary receiver 21 is carried out using the sensor stations (11_4 and 11_5) located around the respective secondary transmitters (10_1 and 10_2) and the sensor station 11_6 located around the primary receiver 21.

Figure 11:
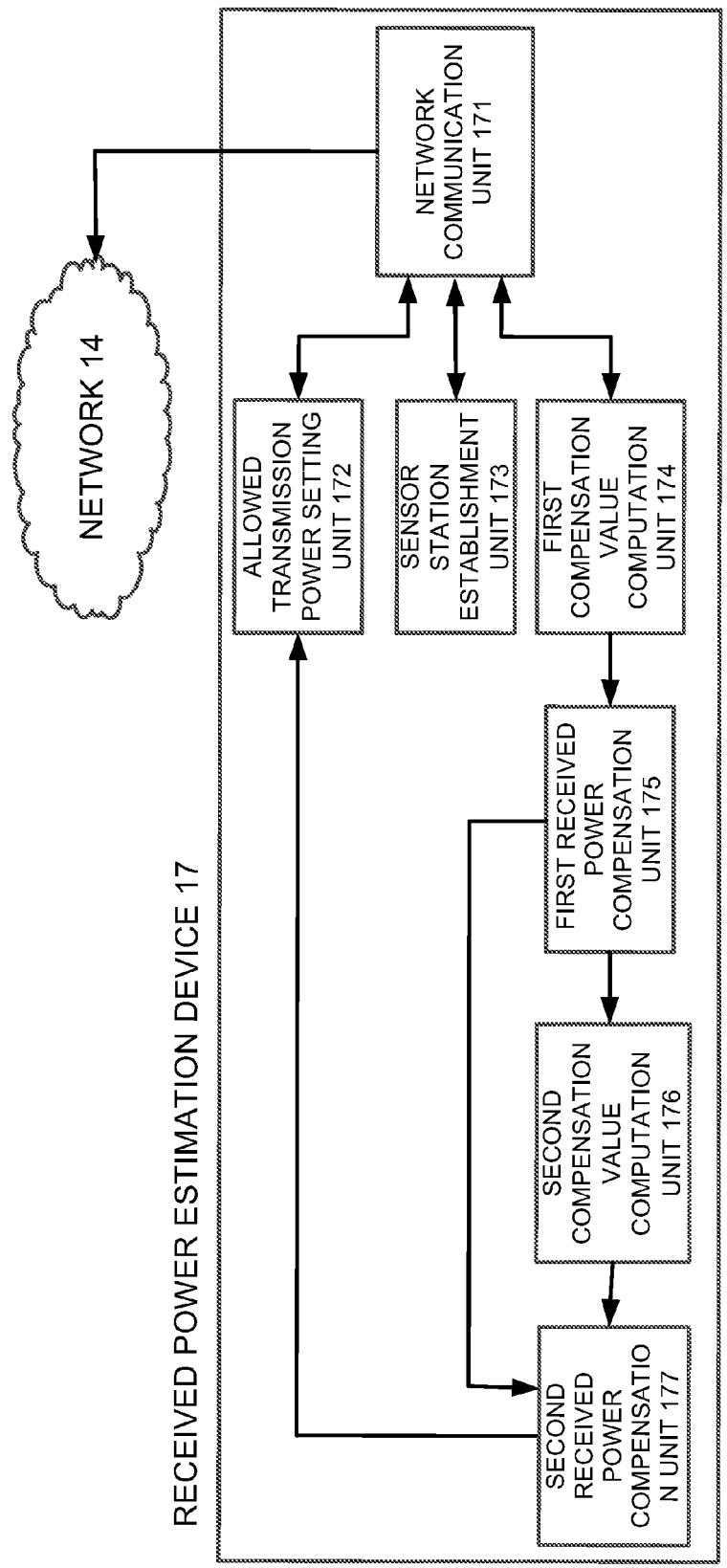
FIG. 11 is a block diagram illustrating an exemplary configuration of a received power estimation device according to the third embodiment of the present invention.

FIG. 11 illustrates a received power estimation device 17 according to the present embodiment. The received power estimation device 17 includes a network communication unit 171, an allowed transmission power setting unit 172, a sensor station establishment unit 173, a primary compensation value computation unit 174, a primary received power compensation unit 175, a secondary compensation value computation unit 176, and a secondary received power compensation unit 177.

The network communication unit 171 and the allowed transmission power setting unit 172 have functions identical to the network communication unit 161 and the allowed transmission power setting unit 162, respectively, of the received power estimation device 16.

The sensor station establishment unit 173 selects, as described above, the sensor stations (11_4 and 11_5) located around the secondary transmitters (10_1 and 10_2), respectively, and the sensor station 11_6 located around the primary receiver 21 as the sensor stations for measurement. Here, a method for selecting the sensor station in the periphery of the secondary transmitter is identical to that of the first embodiment or that of the second embodiment. Meanwhile, in the method for selecting the sensor station in the periphery of the primary receiver, for example, a sensor station close to the primary receiver 21 or a sensor station distant from the primary receiver 21 by a distance equal to or less than a predetermined value is selected.

The sensor station establishment unit 173 transmits a measurement request to each of the selected sensor stations 11_4, 11_5, and 11_6 to teach a frequency at which measurement is to be carried out.

The primary compensation value computation unit 174 calculates, similar to the compensation value computation unit 164 of the received power estimation device 16, a compensation value for each secondary signal (hereinafter referred to as "primary compensation value") using the measured received power of the secondary signal measured at the sensor stations 11_4 and 11_5 in the periphery of the respective secondary transmitters. Thus calculated each primary compensation value is output to the primary received power compensation unit 175.

The primary received power compensation unit 175 carries out compensation for each secondary signal the received power estimate of the secondary signal at the primary receiver 21, the received power estimate being calculated using the path loss estimate, and the received power estimate of the secondary signal at the sensor station 11_6 in the periphery of the primary receiver, the received power estimate being calculated using the path loss estimate. The above compensation is carried out using the primary compensation value for each secondary signal input from the primary compensation value computation unit 174. Alternatively, the primary received power compensation unit 175 may compensate either one of the received power estimate of the secondary signal at the primary receiver 21 and the received power estimate of the secondary signal at the sensor station 11_6 in the periphery of the primary receiver. Hereinafter, such a case is assumed that both of the received power estimates are compensated. The compensation is carried out, similar to (Equation 7) in the first embodiment, by weighing and adding the primary compensation value to each of the received power estimates.

The received power estimate of the secondary signal at the primary receiver 21 is output to the secondary received power compensation unit 177 after the compensation of the received power is carried out for each secondary signal.

Meanwhile, the received power estimate of the secondary signal at the sensor station 11_6 in the periphery of the primary receiver is output to the secondary compensation value computation unit 176 after the compensation of the received power is carried out for each secondary signal.

The received power estimate of the secondary signal at the sensor station 11_6 in the periphery of the primary receiver is input into the secondary compensation value computation unit 176 from the primary received power compensation unit 175. Also, the secondary compensation value computation unit 176 obtains the summed received power of the secondary signal measured at the sensor station 11_6 in the periphery of the primary receiver via the network communication unit 171.

Initially, the secondary compensation value computation unit 176 calculates a sum of the input received power estimate of each secondary signal at the sensor station 11_6 in the periphery of the primary receiver. Subsequently, the secondary compensation value computation unit 176 calculates a differential value between the resulting sum and the summed received power of the secondary signal measured at the sensor station 11_6 in the periphery of the primary receiver. Then, according to the differential value, the secondary compensation value computation unit 176 calculates a value for compensating the received power estimate for each secondary signal and adds the resulting value to the received power estimate of each secondary signal at the sensor station 11_6 in the periphery of the primary receiver. This value is treated as the measured received power of each secondary signal in the sensor station 11_6 in the periphery of the primary receiver.

For example, as an exemplary value for revising the received power estimate, if the differential value is the one calculated according to the dB notation, it is possible to use the differential value, as it is, as the value for revising the received power estimate of each secondary signal. This is equivalent to revision, in a case where the differential value is represented by a true value notation, where a value obtained such that the differential value is divided by the number of secondary signals is added to the received power estimate of each secondary signal at the sensor station 11_6 in the periphery of the primary receiver.

Also, in another method, according to an error variance of the received power estimate of each secondary signal at the sensor station 11_6 in the periphery of the primary receiver, a value for revising the received power estimate for each secondary signal may be determined. However, a degree of the error variance of the received power estimate of each secondary signal is not always the same, for example, in the following cases. That is, a case where the propagation model to be used in calculation of the received power estimate of each secondary signal varies depending on a radio environment condition such as in-prospect or outside-prospect and thus the estimation error of the propagation model itself varies and a case where the received power estimate of the secondary signal compensated by the sensor station in the periphery of the secondary transmitter and the received power estimate of the secondary signal that is not compensated by the sensor station in the periphery of the secondary transmitter are mixed. In these cases, when the error variance of the received power estimate of the signal of the secondary transmitter 10_1 is larger than the error variance of the received power estimate of the signal of the secondary transmitter 10_2, it is proposed to add the differential value larger in ratio to the received power estimate of the signal of the secondary transmitter 10_1. For example, when the error variance of the received power estimate of the signal of the secondary transmitter 10_1 is $\sigma_1^2$ and when the error variance of the received power estimate of the signal of the secondary transmitter 10_1 is $\sigma_2^2$, a value obtained such that the differential value is multiplied by $\sigma_1^2/(\sigma_1^2+\sigma_2^2)$ is added to the received power estimate of the signal of the secondary transmitter 10_1, and a value obtained such that the differential value is multiplied by $\sigma_2^2/(\sigma_1^2+\sigma_2^2)$ is added to the received power estimate of the signal of the secondary transmitter 10_2. Accordingly, change of the ratio for adding the differential value to the received power estimate of each secondary signal according to the error variance ensures more accurate calculation of the received power of each secondary signal to be measured at the sensor station 11_6 in the periphery of the primary receiver. Meanwhile, if $\sigma_1^2$ equals to $\sigma_2^2$, this method is equivalent to a method in which a value obtained such that the differential value is divided by the number of secondary signals is set to a revised value.

Then, the secondary compensation value computation unit 176 calculates a differential value between the measurement value of the received power for each secondary signal at the sensor station 11_6 in the periphery of the primary receiver and the received power estimate of the secondary signal at the sensor station 11_6 in the periphery of the primary receiver, the received power estimate of the secondary signal being input from the primary received power compensation unit 175, the measurement value and the received power estimate being obtained according to the above procedure. Thus obtained differential value is set to a secondary compensation value. The secondary compensation value is calculated for each secondary signal and output to the secondary received power compensation unit 177.

The secondary received power compensation unit 177 receives the received power estimate of the secondary signal at the primary receiver 21 from the primary received power compensation unit 175 as well as receives the secondary compensation value from the secondary compensation value computation unit 176.

The secondary received power compensation unit 177 compensates the received power estimate of the secondary signal at the primary receiver 21 using the secondary compensation value. The (Equation 7) is applicable to this compensation.

The received power estimate of the secondary signal at the primary receiver 21, the received power estimate being compensated by the secondary compensation value, is output to the allowed transmission power setting unit 172.

According to the third embodiment as described above, both of the sensor station in the periphery of the secondary transmitter and the sensor station in the periphery of the primary receiver are caused to carry out the measurement of the received power of the secondary signal. Then, based on the measurement result, the received power estimate for each secondary signal at the primary receiver is compensated in two steps.

At the primary step, use of the sensor station in the periphery of the secondary transmitter ensures reception of a desired secondary signal at high level, thereby enabling measurement of received power of each respective secondary signal. Then, the received power is compensated. Accordingly, it becomes possible to compensate influence of the path loss estimation error due to the environment in the periphery of the secondary transmitter and a difference between the actual transmission power and the allowed transmission power of the secondary transmitter.

Meanwhile, at the secondary step, use of the sensor station in the periphery of the primary receiver for measurement enables further compensation of the path loss estimation error depending on the environment in the periphery of the primary receiver. However, each received power of the secondary signal becomes smaller at the sensor station in the periphery of the primary receiver and thus measurement thereof becomes difficult. As a result, measurement of the sum of the received power of the secondary signal and use of the compensation of the received power at the primary step enable calculation of the measured received power of each secondary signal from the sum of the secondary signal power at the sensor station in the periphery of the primary receiver. By using thus obtained measured received power of each secondary signal, at the secondary step, the received power is compensated to finally obtain the power estimate value of the secondary signal at the primary receiver.

According to the present embodiment, even in a case where it is difficult to estimate the received power of the individual secondary signal at the sensor station, it becomes possible to utilize the measurement at the sensor station in the periphery of the primary receiver. This makes it possible to further compensate the path loss estimation error depending on the environment in the periphery of the primary receiver. As a result, the estimation error of the CIR can be decreased, and the margin required to be set to the allowed transmission power of the secondary transmitter can be made smaller, thereby enabling increase of the allowed transmission power.

According to the primary to third embodiments as described above, more accurate estimation of the received power of the secondary signal at the primary receiver will be realized. As a result, it is possible to decrease the estimation error of the CIR and to make the margin necessary to be set to the allowed transmission power of the secondary transmitter smaller. This achieves increase of the allowed transmission power.

Further, in the primary to third embodiments as described above, it is assumed that the sensor station that measures the received power of the secondary signal measures also the received power of the primary signal. The present invention, however, is not limited to these embodiments. In the present invention, it is also possible to provide the sensor station for measurement of the received power of the secondary signal independently from the sensor station for measurement of the received power of the primary signal. For example, it is possible to determine the sensor station for measurement of the received power of the secondary signal by any one of the methods of the primary to third embodiments. It is also possible to set the sensor station for measurement of the received power of the primary signal to a sensor station in the periphery of the primary receiver or a sensor station located on or in the adjacent to a straight line joining the primary transmitter with the primary receiver. Selection of the sensor station for measurement of the received power of the primary signal in the above described manner ensures measurement of the primary signal in the sensor station in the periphery of the primary receiver since the received power of the primary signal is larger than that of the secondary signal around the primary receiver. In addition thereto, it is possible to compensate the received power estimation error of the primary signal with high accuracy since the sensor station is located near the primary receiver.

Further, in the primary to third embodiments as described above, each of the primary system and the secondary system may belong to a different RAT (Radio Access Technology) or may belong to the same RAT. An example of a case where each system belongs to the different RAT may include, as described above, a combination of the TV broadcasting system and the cellular system. An example of a case where both systems belong to the same RAT may include a case where the primary system is a macrocell and the secondary system is a femtocell encompassed therein.

Further, in the primary to third embodiments as described above, each of the received power estimation device, the radio environment database, and the sensor station may belong, in so far as providing a frequency management to a plurality of secondary systems, to a separate system independent from the secondary system or may be a part of the secondary system.

Meanwhile, the primary to third embodiments as described above can be embodied in, for example, specific hardware such as a circuit.

Further, each of the primary to third embodiments as described above can be controlled by a not-shown computer circuit (e.g., CPU (Central Processing Unit)) based on a control program for its operation. In this case, the control programs are stored, for example, in a device or a storage medium within the system (e.g., a ROM (Read Only Memory)) and a hard disk) or in an external storage medium (e.g., a removable medium and a removable disk). In either case, the control programs are read out by the computer circuit to be executed.

It is possible to express the contents of the above embodiments as set forth below.

(Supplementary note 1) A received power estimation device for estimating received power at a time when a secondary radio signal transmitted from a transmitter of a secondary radio system is received at a receiver of a primary radio system while a frequency allocated to the primary radio system is shared with the secondary radio system, the received power estimation device including compensation means compensating a received power estimate of the secondary radio signal at the receiver of the primary radio system, the received power estimate of the secondary radio signal being calculated using a path loss estimate from the transmitter of the secondary radio system to the receiver of the primary radio system, using a measured received power of the secondary radio signal measured at a near-transmitter sensor station that is located around the transmitter of the secondary radio system.

(Supplementary note 2) The received power estimation device according to supplementary note 1,
wherein the near-transmitter sensor station is
a single sensor station or a plurality of sensor stations selected based on a criterion that the following power ratio is large, or
a single station or a plurality of stations selected based on a criterion that the following power ratio is equal to or more than a predetermined value,
and the power ratio is defined as a ratio between the received power estimate of the secondary radio signal at the sensor station and the received power estimate of the primary radio signal of the transmitter of the primary radio system at the sensor station, where the received power estimate of the secondary radio signal is calculated using a path loss estimate from the transmitter of the secondary radio system to the sensor station, and the received power estimate of the primary radio signal is calculated using a path loss estimate from the transmitter of the primary radio system to the sensor station.

(Supplementary note 3) The received power estimation device according to supplementary note 1,
wherein the near-transmitter sensor station is
a single sensor station or a plurality of sensor stations selected based on a criterion that the following power ratio is large, or
a single station or a plurality of stations selected based on a criterion that the following power ratio is equal to or more than a predetermined value,
and the power ratio is defined as a ratio between the received power estimate of the secondary radio signal at the sensor station and a sum of the received power estimate of the secondary radio signal of another transmitter at the sensor station and the received power estimate of the primary radio signal at the sensor station, where the received power estimate of the secondary radio signal is calculated using the path loss estimate from the transmitter of the secondary radio system to the sensor station, the received power estimate of the secondary radio signal of the another transmitter is calculated using a path loss estimate from the another transmitter of the secondary radio system to the sensor station, the received power estimate of the primary radio signal is calculated using the path loss estimate from the transmitter of the primary radio system to the sensor station.

(Supplementary note 4) The received power estimation device according to supplementary note 1, wherein the near-transmitter sensor station is a single sensor station or a plurality of sensor stations determined based on a distance from the transmitter of the secondary radio system to the sensor station.

(Supplementary note 5) The received power estimation device according to any one of supplementary notes 1 to 4, wherein the compensation means is configured to compensate the received power estimate of the secondary radio signal at the receiver of the primary radio system further using the measured received power of the secondary radio signal measured in a near-receiver sensor station that is located around the receiver of the primary radio system.

(Supplementary note 6) The received power estimation device according to supplementary note 5, wherein the compensation means is configured to compensate the received power estimate of the secondary radio signal at the near-receiver sensor station using the measured received power of the secondary radio signal measured by the near-transmitter sensor station, the received power estimate of the secondary radio signal being calculated using a path loss estimate from the transmitter of the secondary radio system to the near-receiver sensor station, calculate a differential value between a sum of the compensated received power estimate of the secondary radio signal and the measured received power of a summed secondary radio signal measured at the near-receiver sensor station, and calculate the received power of the secondary radio signal at the near-receiver sensor station using the differential value and the compensated received power estimate of each secondary radio signal.

(Supplementary note 7) The received power estimation device according to supplementary note 6, wherein the received power of the secondary radio signal at the near-receiver sensor station is calculated in such a manner that a value obtained by dividing the differential value by a total number of the secondary radio signals is added to the compensated received power estimate of each secondary radio signal.

(Supplementary note 8) The received power estimation device according to supplementary note 6, wherein the received power of the secondary radio signal at the near-receiver sensor station is calculated using the differential value and a variance of errors of the compensated received power estimate of the secondary radio signal.

(Supplementary note 9) The received power estimation device according to any one of supplementary notes 1 to 8, further including allowed transmission power adjustment means adjusting allowed transmission power for a frequency used by the transmitter of the secondary radio system using the received power estimate of the secondary radio signal at the receiver of the primary radio system, the received power estimate of the secondary radio signal being calculated by the compensation means.

(Supplementary note 10) The received power estimation device according to supplementary note 9, wherein the received power estimate of the secondary radio signal at the receiver of the primary radio system is calculated using the allowed transmission power and the path loss estimate from the transmitter of the secondary radio system to the receiver of the primary radio system, and wherein the compensation means is configured to determine a weight coefficient for compensating the received power estimate of the secondary radio signal at the receiver of the primary radio system according to a degree of error assumed between the allowed transmission power and actual transmission power and a degree of error assumed with respect to the path loss estimate from the transmitter of the secondary radio system to the receiver of the primary radio system.

(Supplementary note 11) The received power estimation device according to any one of supplementary notes 1 to 10, further including notification means specifying a near-transmitter sensor station for each transmitter of the secondary system and notifying the near-transmitter sensor station of a frequency at which the measurement of the secondary radio signal is to be carried out.

(Supplementary note 12) The received power estimation device according to supplementary note 11, wherein the notification means is configured to notify the near-transmitter sensor station of a frequency at which allowed transmission power of the transmitter of the secondary radio system is equal to or more than a predetermined value as a frequency at which the measurement of the secondary radio signal is to be carried out.

(Supplementary note 13) The received power estimation device according to any one of supplementary notes 1 to 12, further including transmission power estimation means storing the measured received power obtained such that the secondary radio signal transmitted in advance by the transmitter of the secondary radio system with a predetermined transmission power is measured at the near-transmitter sensor station, comparing a measured received power measured in advance with a currently measured received power of the transmitter of the secondary radio system measured at the near-transmitter sensor station, and estimating a current transmission power of the transmitter of the secondary radio system.

(Supplementary note 14) A method for estimating received power at a time when a secondary radio signal transmitted from a transmitter of a secondary radio system is received at a receiver of a primary radio system while a frequency allocated to the primary radio system is shared with the secondary radio system, wherein a received power estimate of the secondary radio signal at the receiver of the primary radio system is compensated using a measured received power of the secondary radio signal measured at a near-transmitter sensor station that is located around the transmitter of the secondary radio system, the received power estimate of the secondary radio signal being calculated using a path loss estimate from the transmitter of the secondary radio system to the receiver of the primary radio system.

(Supplementary note 15) A program for estimating a received power at a time when a secondary radio signal transmitted from a transmitter of a secondary radio system is received at a receiver of a primary radio system while a frequency allocated to the primary radio system is shared with the secondary radio system, the program causing a computer to carry out compensation of the received power estimate of the secondary radio signal at the receiver of the primary radio system using a measured received power of the secondary radio signal measured in a near-transmitter sensor station that is located around the transmitter of the secondary radio system, the received power estimate of the secondary radio signal being calculated using a path loss estimate from the transmitter of the secondary radio system to the receiver of the primary radio system.

(Supplementary note 16) A sensor station to be used together with a received power estimation device that estimates received power at a time when a secondary radio signal transmitted from a transmitter of a secondary radio system is received at a receiver of a primary radio system while a frequency allocated to the primary radio system is shared with the secondary radio system, the sensor station including means measuring the received power of the secondary radio signal based on an instruction of the received power estimation device, and notification means notifying the measured received power to the received power estimation device.

(Supplementary note 17) The sensor station according to supplementary note 16, wherein the sensor station is located around the transmitter of the secondary radio system.

(Supplementary note 18) The sensor station according to supplementary note 16 or 17, wherein the means measuring the received power is configured to carry out measurement of the secondary radio signal at each frequency notified from the received power estimation device and specify a high received power frequency as a frequency used by the transmitter of the secondary radio system, and wherein the notification means is configured to notify the specified frequency and the measured received power to the received power estimation device.

(Supplementary note 19) A radio system including a sensor station and a received power estimation device that estimates a received power at a time when a secondary radio signal transmitted from a transmitter of a secondary radio system is received at a receiver of a primary radio system while a frequency allocated to the primary radio system is shared with the secondary radio system, wherein the sensor station includes means measuring the secondary radio signal based on an instruction of the received power estimation device to notify the measured received power to the received power estimation device, and wherein the received power estimation device includes means specifying a sensor station located around the transmitter of the secondary radio system to instruct the sensor station to measure the received power of the secondary radio signal, obtaining the measured received power of the secondary radio signal from the sensor station, and calculating a received power estimate of the secondary radio signal at the receiver using a path loss estimate from the transmitter of the secondary radio system to the receiver of the primary radio system to compensate the received power estimate using the measured received power.

(Supplementary note 20) The radio system according to supplementary note 19, wherein the sensor station is located around the transmitter of the secondary radio system.

(Supplementary note 21) The radio system according to supplementary note 19 or 20, wherein the means measuring the received power of the sensor station is configured to carry out measurement of the secondary radio signal at each frequency notified from the received power estimation device and specify a high received power frequency as a frequency used at the transmitter of the secondary radio system, and wherein the notification means is configured to notify the specified frequency and the measured received power to the received power estimation device.

(Supplementary note 22) The radio system according to any one of supplementary notes 19 to 21, wherein the compensation means of the received power estimation device is configured to compensate the received power estimate of the secondary radio signal at the receiver of the primary radio system further using the measured received power of the secondary radio signal measured in the near-receiver sensor station that is located around the receiver of the primary radio system.

(Supplementary note 23) The radio system according to supplementary note 22, wherein the compensation means is configured to compensate the received power estimate of the secondary radio signal at the near-receiver sensor station using the measured received power of the secondary radio signal measured by the near-transmitter sensor station, the received power estimate of the secondary radio signal being calculated using a path loss estimate from the transmitter of the secondary radio system to the near-receiver sensor station, calculate a differential value between a sum of the compensated received power estimate of the secondary radio signal and the measured received power of a sum of the secondary radio signal measured at the near-receiver sensor station, and calculate the received power of the secondary radio signal at the near-receiver sensor station using the differential value and the compensated received power estimate of each secondary radio signal.

The present invention has been described above exemplifying the embodiments. The present invention, however, is not necessarily limited to the above embodiments, but may be modified to be carried out in various forms without departing from the technical concept of the present invention. Each of the embodiments may be combined, as required, for carrying out the invention.

This application claims the benefit of Japanese Application No. 2011-285233, filed Dec. 27, 2011, the disclosure of which is hereby incorporated by reference.

REFERENCE SIGNS LIST

10 secondary transmitter
11, 11_1, 11_2, 11_3, 11_4, 11_5, 11_6 sensor station
12, 16, 17 received power estimation device
13 radio environment database
14 network
20 primary transmitter
21 primary receiver
22 primary system service area
111 network communication unit
112 receiving RF unit
113 received power measurement unit
121 network communication unit
122 allowed transmission power setting unit
123 sensor station establishment unit
124 compensation value computation unit
125 received power compensation unit
161 network communication unit
162 allowed transmission power setting unit
163 sensor station establishment unit
164 compensation value computation unit
165 received power compensation unit
171 network communication unit
172 allowed transmission power setting unit
173 sensor station establishment unit
174 primary compensation value computation unit
175 primary received power compensation unit
176 secondary compensation value computation unit
177 secondary received power compensation unit

The invention claimed is:

1. A received power estimation device for estimating received power at a time when a secondary radio signal transmitted from a transmitter of a secondary radio system is received at a receiver of a primary radio system while a frequency allocated to the primary radio system is shared with the secondary radio system, the received power estimation device comprising:

at least one processor;

a memory coupled to the at least one processor, the at least one processor being configured to compensate a received power estimate of the secondary radio signal at the receiver of the primary radio system, the received power estimate of the secondary radio signal being calculated using a path loss estimate from the transmitter of the secondary radio system to the receiver of the primary radio system, using a measured received power of the secondary radio signal measured at a near-transmitter sensor station that is located around the transmitter of the secondary radio system, wherein the near-transmitter sensor station is a single sensor station or a plurality of sensor stations selected based on a criterion that the following power ratio is large, or a single station or a plurality of stations selected based on a criterion that the following power ratio is equal to or more than a predetermined value, and the power ratio is defined as a ratio between the received power estimate of the secondary radio signal at the sensor station and the received power estimate of the primary radio signal of the transmitter of the primary radio system at the sensor station, where the received power estimate of the secondary radio signal is calculated using a path loss estimate from the transmitter of the secondary radio system to the sensor station, and the received power estimate of the primary radio signal is calculated using a path loss estimate from the transmitter of the primary radio system to the sensor station.

2. The received power estimation device according to claim 1, wherein the near-transmitter sensor station is a single sensor station or a plurality of sensor stations selected based on a criterion that the following power ratio is large, or a single station or a plurality of stations selected based on a criterion that the following power ratio is equal to or more than a predetermined value, and the power ratio is defined as a ratio between the received power estimate of the secondary radio signal at the sensor station and a sum of the received power estimate of the secondary radio signal of another transmitter at the sensor station and the received power estimate of the primary radio signal at the sensor station, where the received power estimate of the secondary radio signal is calculated using the path loss estimate from the transmitter of the secondary radio system to the sensor station, the received power estimate of the secondary radio signal of the another transmitter is calculated using a path loss estimate from the another transmitter of the secondary radio system to the sensor station, and the received power estimate of the primary radio signal is calculated using the path loss estimate from the transmitter of the primary radio system to the sensor station.

3. The received power estimation device according to claim 2, wherein the at least one processor is configured to compensate the received power estimate of the secondary radio signal at the receiver of the primary radio system further using the measured received power of the secondary radio signal measured at a near-receiver sensor station located around the receiver of the primary radio system.

4. The received power estimation device according to claim 1, wherein the near-transmitter sensor station is a single sensor station or a plurality of sensor stations determined based on a distance from the transmitter of the secondary radio system to the sensor station.

5. The received power estimation device according to claim 1, wherein the at least one processor is configured to compensate the received power estimate of the secondary radio signal at the receiver of the primary radio system further using the measured received power of the secondary radio signal measured at a near-receiver sensor station located around the receiver of the primary radio system.

6. The received power estimation device according to claim 5, wherein the at least one processor is configured to compensate the received power estimate of the secondary radio signal at the near-receiver sensor station using the measured received power of the secondary radio signal measured by the near-transmitter sensor station, the received power estimate of the secondary radio signal being calculated using a path loss estimate from the transmitter of the secondary radio system to the near-receiver sensor station;

calculate a differential value between a sum of the compensated received power estimate of the secondary radio signal and the measured received power of a summed secondary radio signal measured at the near-receiver sensor station; and calculate the received power of the secondary radio signal at the near-receiver sensor station using the differential value and the compensated received power estimate of each secondary radio signal.

7. The received power estimation device according to claim 6, wherein the received power of the secondary radio signal at the near-receiver sensor station is calculated in such a manner that a value obtained by dividing the differential value by a total number of the secondary radio signals is added to the compensated received power estimate of each secondary radio signal.

8. The received power estimation device according to claim 6, wherein the received power of the secondary radio signal at the near-receiver sensor station is calculated using the differential value and a variance of errors of the compensated received power estimate of the secondary radio signal.

9. The received power estimation device according to claim 1, wherein the received power estimation device is configured to adjust allowed transmission power for a frequency used by the transmitter of the secondary radio system using the received power estimate of the secondary radio signal at the receiver of the primary radio system, the received power estimate of the secondary radio signal being calculated by the at least one processor.

10. The received power estimation device according to claim 9, wherein the received power estimate of the secondary radio signal at the receiver of the primary radio system is calculated using the allowed transmission power and the path loss estimate from the transmitter of the secondary radio system to the receiver of the primary radio system; and wherein the at least one processor is configured to determine a weight coefficient for compensating the received power estimate of the secondary radio signal at the receiver of the primary radio system according to a degree of error assumed between the allowed transmission power and actual transmission power and a degree of error assumed with respect to the path loss estimate from the transmitter of the secondary radio system to the receiver of the primary radio system.

11. The received power estimation device according to claim 1, wherein the received power estimation device is configured to specify a near-transmitter sensor station for each transmitter of the secondary radio system and notifying the near-transmitter sensor station of a frequency at which the measurement of the secondary radio signal is to be carried out.

12. The received power estimation device according to claim 11, wherein the received power estimation device is configured to notify the near-transmitter sensor station of a frequency at which allowed transmission power of the transmitter of the secondary radio system is equal to or more than a predetermined value as a frequency at which the measurement of the secondary radio signal is to be carried out.

13. The received power estimation device according to claim 1, wherein
the received power estimation device is configured to store the measured received power obtained such that the secondary radio signal transmitted in advance by the transmitter of the secondary radio system with a predetermined transmission power is measured at the near-transmitter sensor station, compare a measured received power measured in advance with a currently measured received power of the transmitter of the secondary radio system measured at the transmission power of the transmitter of the secondary radio system.

14. A method for estimating received power at a time when a secondary radio signal transmitted from a transmitter of a secondary radio system is received at a receiver of a primary radio system while a frequency allocated to the primary radio system is shared with the secondary radio system:
wherein a received power estimate of the secondary radio signal at the receiver of the primary radio system is compensated using a measured received power of the secondary radio signal measured at a near-transmitter sensor station that is located around the transmitter of the secondary radio system, the received power estimate of the secondary radio signal being calculated using a path loss estimate from the transmitter of the secondary radio system to the receiver of the primary radio system, and
the near-transmitter sensor station is
a single sensor station or a plurality of sensor stations selected based on a criterion that a following power ratio is large, or
a single station or a plurality of stations selected based on a criterion that the following power ratio is equal to or more than a predetermined value,
and the power ratio is defined as a ratio between the received power estimate of the secondary radio signal at the sensor station and the received power estimate of the primary radio signal of the transmitter of the primary radio system at the sensor station, where the received power estimate of the secondary radio signal is calculated using a path loss estimate from the transmitter of the secondary radio system to the sensor station, and the received power estimate of the primary radio signal is calculated using a path loss estimate from the transmitter of the primary radio system to the sensor station.

15. A non-transitory computer readable storage medium storing a program for estimating a received power at a time when a secondary radio signal transmitted from a transmitter of a secondary radio system is received at a receiver of a primary radio system while a frequency allocated to the primary radio system is shared with the secondary radio system, the program causing a computer to carry out:
compensation of the received power estimate of the secondary radio signal at the receiver of the primary radio system using a measured received power of the secondary radio signal measured at a near-transmitter sensor station that is located around the transmitter of the secondary radio system, the received power estimate of the secondary radio signal being calculated using a path loss estimate from the transmitter of the secondary radio system to the receiver of the primary radio system,
wherein the near-transmitter sensor station is
a single sensor station or a plurality of sensor stations selected based on a criterion that a following power ratio is large, or
a single station or a plurality of stations selected based on a criterion that the following power ratio is equal to or more than a predetermined value,
and the power ratio is defined as a ratio between the received power estimate of the secondary radio signal at the sensor station and the received power estimate of the primary radio signal of the transmitter of the primary radio system at the sensor station, where the received power estimate of the secondary radio signal is calculated using a path loss estimate from the transmitter of the secondary radio system to the sensor station, and the received power estimate of the primary radio signal is calculated using a path loss estimate from the transmitter of the primary radio system to the sensor station.

16. A sensor station to be used together with a received power estimation device for estimating received power at a time when a secondary radio signal transmitted from a transmitter of a secondary radio system is received at a receiver of a primary radio system while a frequency allocated to the primary radio system is shared with the secondary radio system, the sensor station comprising:
at least one processor;
a memory coupled to the at least one processor, the at least one processor being configured to compensate a received power estimate of the secondary radio signal at the receiver of the primary radio system, the received power estimate of the secondary radio signal being calculated using a path loss estimate from a transmitter of the secondary radio system to the receiver of the primary radio system, using a measured received power of the secondary radio signal measured at a near-transmitter sensor station that is located around a transmitter of the secondary radio system, and the at least one processor is configured to measure the received power of the secondary radio signal based on an instruction of the received power estimation device; and
the at least one processor being configured to notify the measured received power to the received power estimation device,
wherein the near-transmitter sensor station is
a single sensor station or a plurality of sensor stations selected based on a criterion that the following power ratio is large, or
a single station or a plurality of stations selected based on a criterion that the following power ratio is equal to or more than a predetermined value,
and the power ratio is defined as a ratio between the received power estimate of the secondary radio signal at the sensor station and the received power estimate of the primary radio signal of the transmitter of the primary radio system at the sensor station, where the received power estimate of the secondary radio signal is calculated using a path loss estimate from the transmitter of the secondary radio system to the sensor station, and the received power estimate of the primary radio signal is calculated using a path loss estimate from the transmitter of the primary radio system to the sensor station.

17. The sensor station according to claim 16, wherein the sensor station is located around the transmitter of the secondary radio system.

18. The sensor station according to claim 16,
wherein the sensor station is configured to carry out measurement of the secondary radio signal at each frequency notified from the received power estimation device and specify a high received power frequency as a frequency used by the transmitter of the secondary radio system, and wherein the sensor station is configured to notify the specified frequency and the measured received power to the received power estimation device.

19. A radio system, comprising:
a sensor station;
a received power estimation device that estimates a received power at a time when a secondary radio signal transmitted from a transmitter of a secondary radio system is received at a receiver of a primary radio system while a frequency allocated to the primary radio system is shared with the secondary radio system;
at least one processor; and
a memory coupled to the at least one processor, the at least one processor being configured to measure the secondary radio signal based on an instruction of the received power estimation device to notify the measured received power to the received power estimation device, and
to compensate a received power estimate of the secondary radio signal at the receiver of the primary radio system, the received power estimate of the secondary radio signal being calculated using a path loss estimate from the transmitter of the secondary radio system to the receiver of the primary radio system, using a measured received power of the secondary radio signal measured at a near-transmitter sensor station that is located around the transmitter of the secondary radio system,
wherein the at least one processor being configured to specify the sensor station located around the transmitter of the secondary radio system to instruct the sensor station to measure the received power of the secondary radio signal,
obtain the measured received power of the secondary radio signal from the sensor station, and
calculate a received power estimate of the secondary radio signal at the receiver using a path loss estimate from the transmitter of the secondary radio system to the receiver of the primary radio system to compensate the received power estimate using the measured received power,
wherein the near-transmitter sensor station is
a single sensor station or a plurality of sensor stations selected based on a criterion that the following power ratio is large, or
a single station or a plurality of stations selected based on a criterion that the following power ratio is equal to or more than a predetermined value,
and the power ratio is defined as a ratio between the received power estimate of the secondary radio signal at the sensor station and the received power estimate of the primary radio signal of the transmitter of the primary radio system at the sensor station, where the received power estimate of the secondary radio signal is calculated using a path loss estimate from the transmitter of the secondary radio system to the sensor station, and the received power estimate of the primary radio signal is calculated using a path loss estimate from the transmitter of the primary radio system to the sensor station.

* * * * *